(12) United States Patent
Baer et al.

(10) Patent No.: US 7,654,480 B2
(45) Date of Patent: Feb. 2, 2010

(54) MULCHER

(75) Inventors: Mark E. Baer, Trout Run, PA (US); Jason Gottschall, Williamsport, PA (US); Robert Lent Crevling, Jr., Williamsport, PA (US); Randy L. Buss, Muncy, PA (US)

(73) Assignee: Shop Vac Corporation, Williamsport, PA (US)

( * ) Notice: Subject to any disclaimer, the term of this patent is extended or adjusted under 35 U.S.C. 154(b) by 171 days.

(21) Appl. No.: 11/859,760

(22) Filed: Sep. 22, 2007

(65) Prior Publication Data

US 2008/0072396 A1    Mar. 27, 2008

(51) Int. Cl.
 *B02C 18/16* (2006.01)
(52) U.S. Cl. ............... 241/36; 241/37.5; 241/56; 241/100; 241/101.78
(58) Field of Classification Search ............ 241/55, 241/56, 100, 101.78, 169.1, 36, 37.5
See application file for complete search history.

(56) References Cited

U.S. PATENT DOCUMENTS

| | | | |
|---|---|---|---|
| 4,143,823 A * | 3/1979 | Judson, Jr. ............ 241/73 |
| 4,955,107 A | 9/1990 | Kawai |
| 5,085,375 A | 2/1992 | Haworth |
| 5,245,726 A | 9/1993 | Rote et al. |
| 5,294,063 A | 3/1994 | Bote |
| 5,340,036 A | 8/1994 | Riley |
| 5,485,715 A | 1/1996 | Breeden |
| 5,586,359 A | 12/1996 | Iida |
| 5,692,262 A | 12/1997 | Haupt et al. |
| 5,791,568 A | 8/1998 | Keim |
| 5,794,864 A | 8/1998 | Hammett et al. |
| 5,988,540 A * | 11/1999 | Pugh ............ 241/46.17 |
| 6,629,818 B2 | 10/2003 | Svoboda |
| 6,969,018 B2 | 11/2005 | Gimenez Ibanez et al. |

FOREIGN PATENT DOCUMENTS

DE     196 08 376     9/1997
WO    WO 97/44998    12/1997

OTHER PUBLICATIONS

Annex to Form PCT/ISA/2006 Communication Relating to the Results of the Partial International Search Report for Application No. PCT/IB2007/004399, dated Nov. 25, 2008.

* cited by examiner

*Primary Examiner*—Mark Rosenbaum
(74) *Attorney, Agent, or Firm*—Marshall, Gerstein & Borun LLP

(57) ABSTRACT

The disclosed mulcher has a base unit and a shredding blade in a removable assembly. Two different embodiments are disclosed. In both embodiments, shredded material is removed from air exiting the shredding blade before it reaches an exhaust port. In one embodiment, the material is removed by a filter. In the other embodiment, walls are arranged so that debris must double back against high-speed airflow leaving the shredding blade before exiting the unit. The shredding blade can be mounted in front of and on the same shaft as an air impeller, with the back surface of the shredding blade being supported by the impeller. In another embodiment, the air impeller and the shredding blade are carried in assemblies that are separable from each other and are each separately attachable to a base unit. A detachable power module and a detachable blower are also shown. The power module has a safety switch that disables the power module when it is removed. A power receptacle is shown with a switch that alternately switches power to either the shredder motor or to the power receptacle, but not to both simultaneously.

18 Claims, 40 Drawing Sheets

MULCHER

FIELD OF THE DISCLOSURE

This disclosure generally relates to products used to clean residential yards, and more particularly to products used to collect and dispose of fallen leaves or yard waste.

BACKGROUND OF THE DISCLOSURE

Fallen leaves and yard waste are often collected and bagged or composted. Unless shredded, bagged leaves or yard waste can be bulky. Unfortunately, conventional shredders that are used to shred leaves and yard waster can be large and expensive. The large size can be inconvenient, particularly given that the product is generally used during only one season of the year.

The applicants have developed a mulcher that has a removable shredder assembly that enables the product to be used for shredding leaves, yard waste, or other relatively light-weight materials. The shredder assembly can also be removed, enabling the vacuum to be used as a conventional utility vacuum. Because utility vacuums are used during all seasons, the product has more overall use.

BRIEF DESCRIPTION OF THE DRAWINGS

FIG. 12b is a top view of the blades seen in FIG. 12a.

DETAILED DESCRIPTION

One example of a mulcher 10 that embodies the invention is illustrated in the figures. The illustrated mulcher has three primary parts: a base unit 12, a shredder assembly 14 (seen in FIGS. 1-8), and a basic head unit 16 (seen in FIGS. 15-21). Each part will be described in turn.

Figure 8:
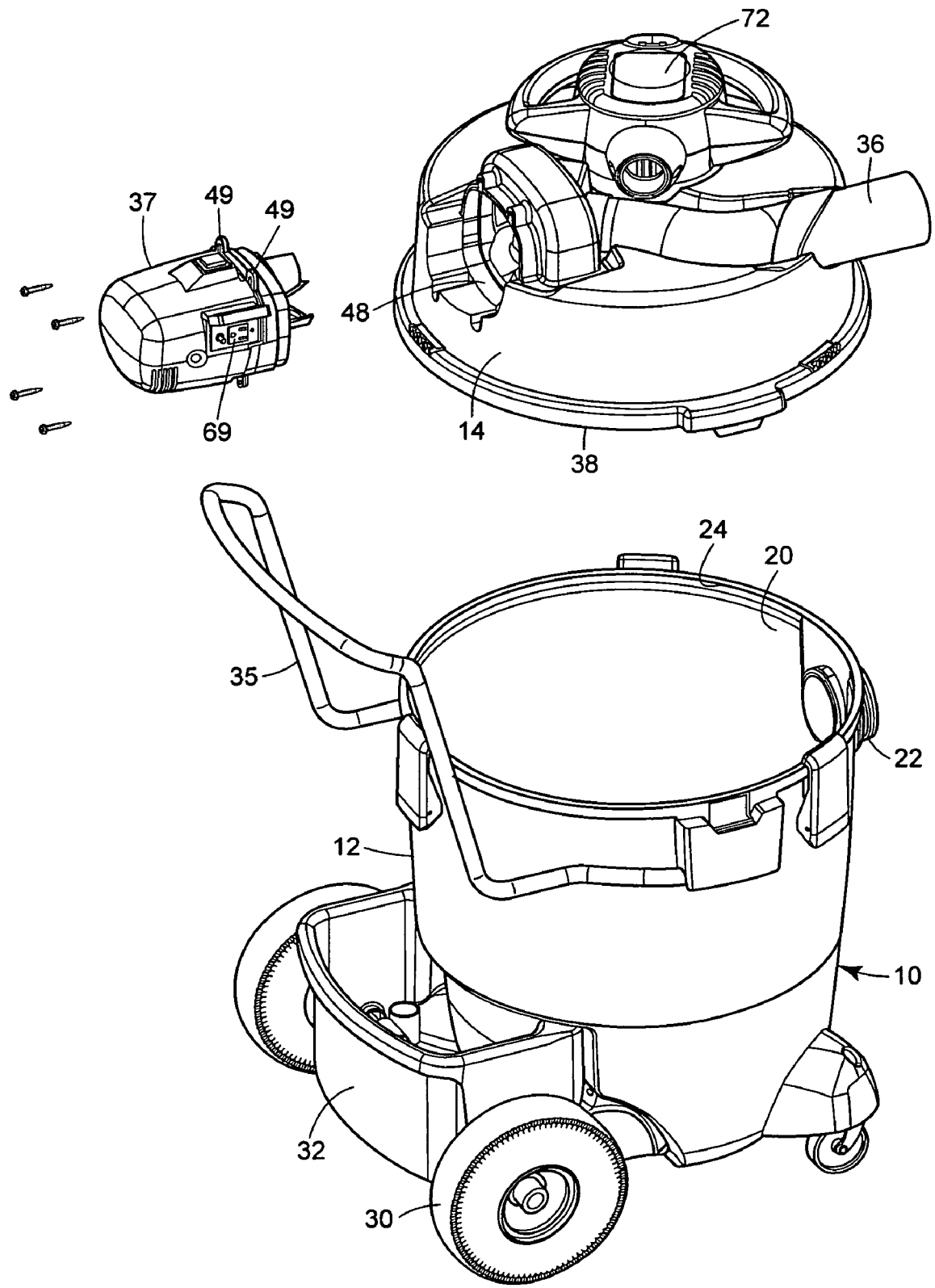
FIG. 8 is a partially exploded perspective view of the mulcher.
Figure 9:
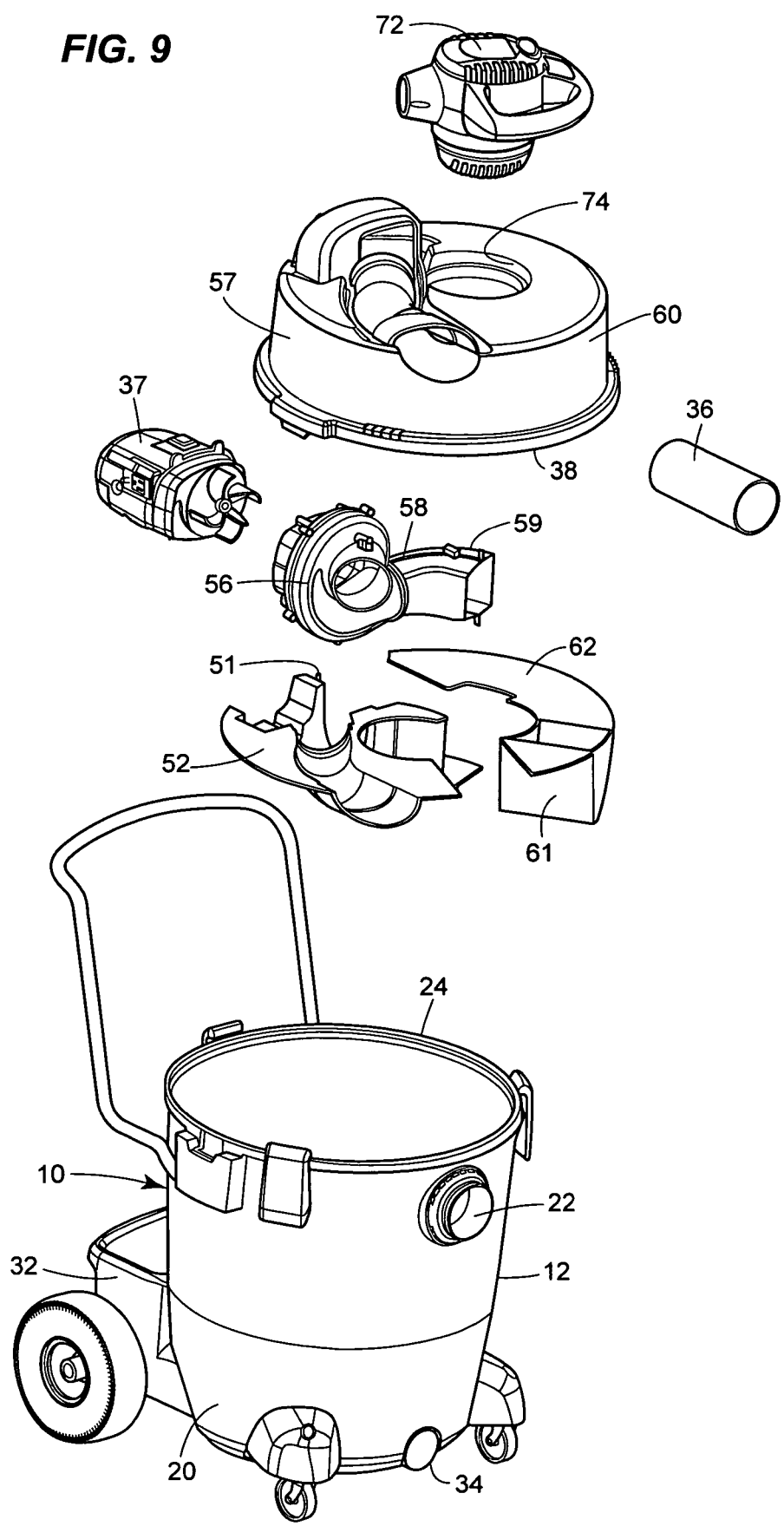
FIGS. 9 and 10 are further exploded perspective views of the mulcher.

The illustrated base unit 12 has a tank wall 20, a closeable port 22, and an open top 24 (see FIGS. 8 and 9). The volume within the tank wall 20 defines a tank chamber (or storage reservoir) that is used to store collected dirt and debris, and can vary in size to meet consumer demands. The port can be used as an inlet during conventional vacuuming, or sealed with a cap (not shown) during mulching. The open top accommodates either the shredder assembly 14 (during mulching) or the head unit 16 (during conventional vacuuming).

The base unit 12 can also include optional features like wheels or casters 30, a storage compartment 32, or a drain 34 for a wet/dry vacuum. A handle 35 can also be attached.

The shredder assembly 14 (best seen in FIGS. 8-14) has a mulching inlet 36, a power module 37, and a lower rim 38. The mulching inlet can be used to collect leaves or other yard waste. The illustrated mulching inlet is part of a pathway that is relatively straight and has a relatively wide diameter. It has only two turns, each through an angle of less than 45°. Together with the 3½" diameter of the inlet and its relatively short length (less than 10"), the straightness of this pathway provides a clog-resistant, easy-feeding inlet for leaves or yard waste. Other arrangements are possible, but it is preferred that the pathway to the power module be relatively wide and straight.

Figure 11:
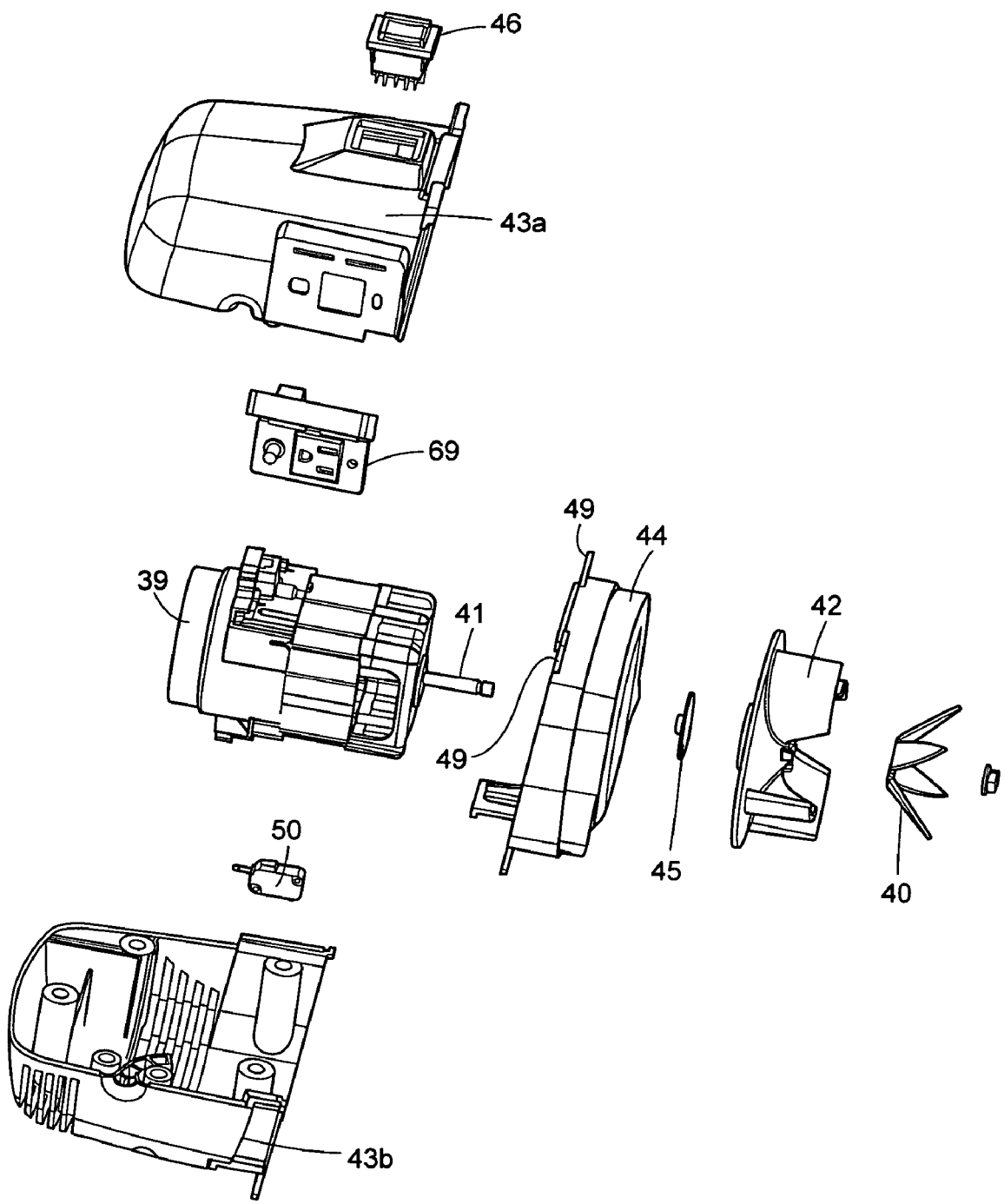
FIG. 11 is an exploded perspective view of the motor unit for the mulcher.
Figure 12A:
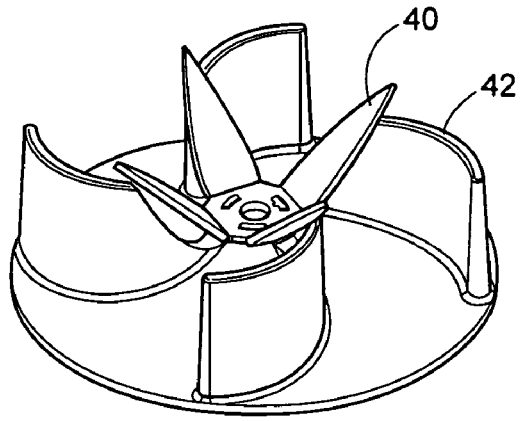
FIG. 12a is a perspective view of blades in the shredder assembly.
Figure 12B:
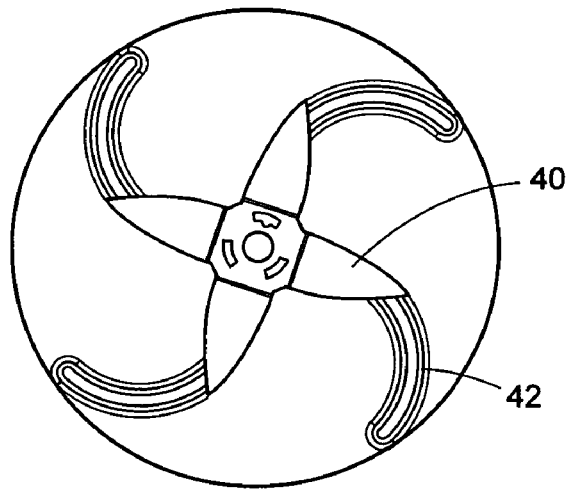
Figure 12C:
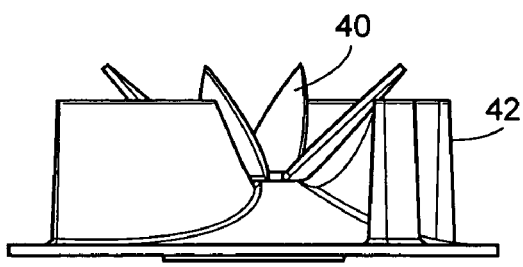
FIG. 12c is a side view of the blades.
Figure 12D:
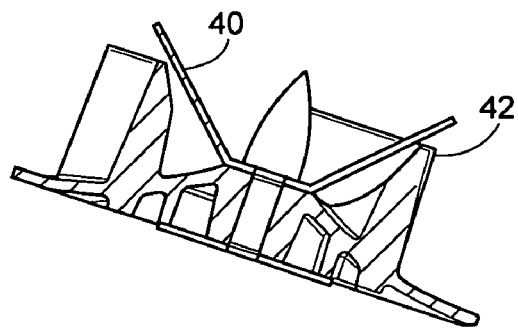
FIG. 12d is a cross-sectional side view of the blades.

The power module 37 cuts the material that is drawn in through the mulching inlet 36. As seen in FIG. 11, the illustrated power module is powered by a motor 39, and preferably has a mulcher (or shredding) blade 40 that is optimized for shredding leaves, rather than for moving air. In the illustrated arrangement, the shredding blade is mounted in front of and on the same shaft 41 as optional air impeller blades 42. In this example, the air impeller blades help to draw material to the shredding blade. In FIG. 12, the illustrated shredding blade is made of metal, and sits on top of and is supported by plastic impeller blades. This arrangement may help to prevent the shredding blade from deforming under centripetal force.

As seen in FIG. 11, the illustrated motor 39 is mounted between top and bottom covers 43a and 43b that fit against a motor plate 44. The shaft 41 extends through the motor plate, and a spacer 45 on the shaft provides clearance between the impeller blades 42 and the motor plate. A power switch 46 on the top cover enables a user to switch the motor on and off.

The power module 37 fits onto a receptacle 48. As best seen in FIG. 8, in this example the receptacle is in the shredder assembly 14. Although positioning the receptacle in the shredder assembly is generally preferred, in some instances it might be useful to mount the power module onto a receptacle in the base unit 12. Here, mounts 49 on the motor plate 44 enable the power module to be screwed onto the shredder assembly for ease of servicing. If the shredding blade 40 or the motor 39 would need to be repaired or replaced, the owner could remove the power module and return that assembly alone to the manufacturer or supplier for service.

Figure 13:
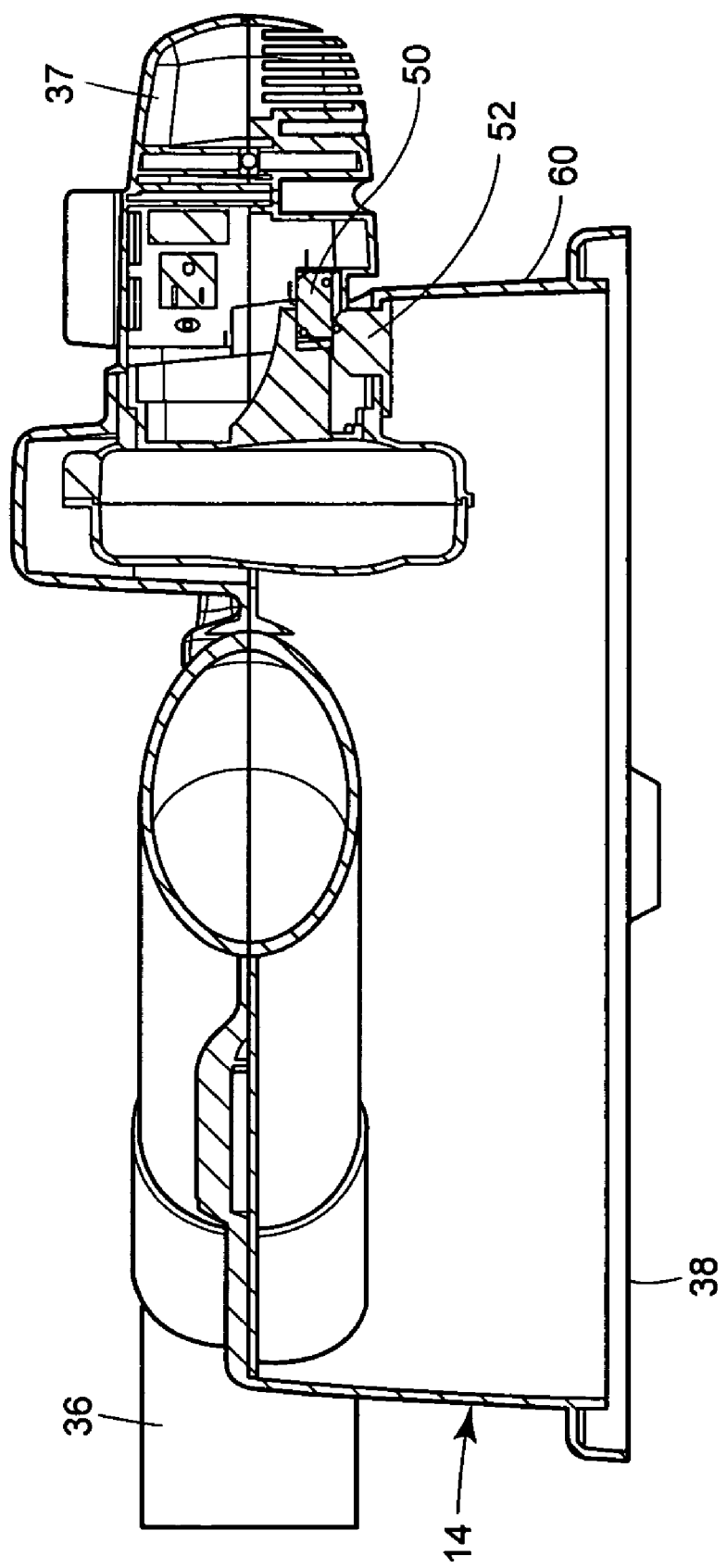
FIG. 13 is a side sectional view of a portion of the mulcher.
Figure 14A:
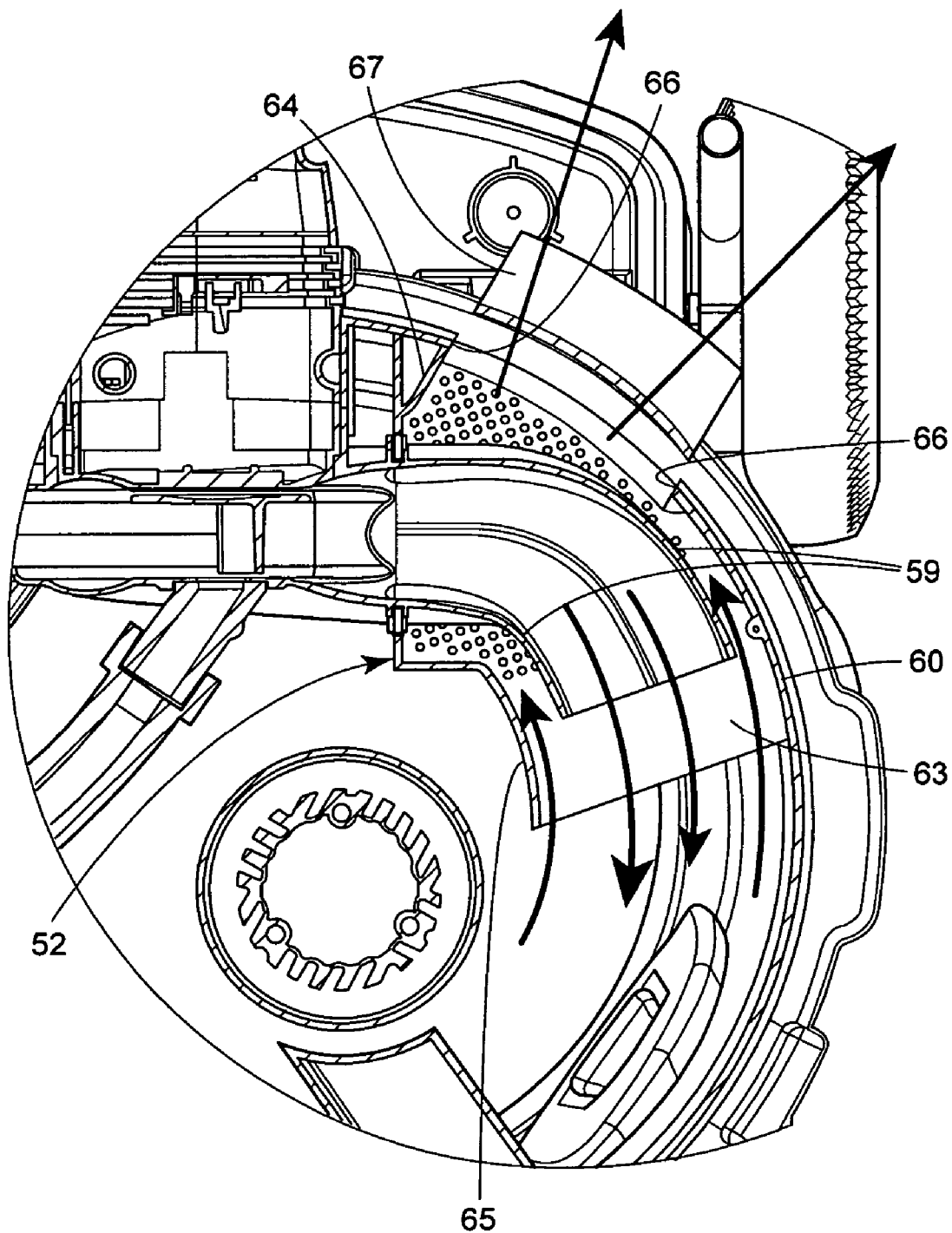
FIGS. 14a and b are enlarged cross-sectional views through sections of the shredder assembly.
Figure 14B:
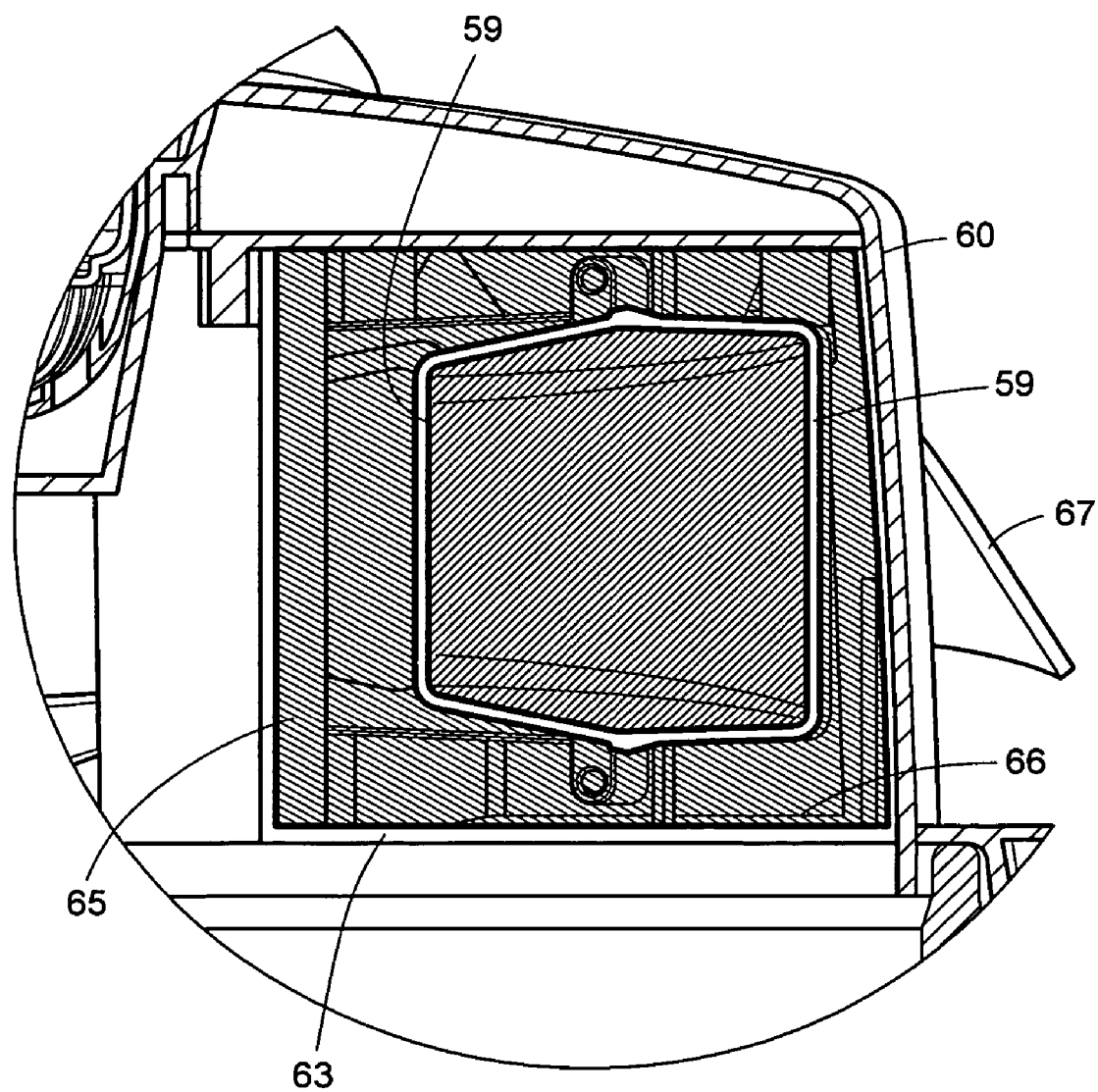
Figure 15:
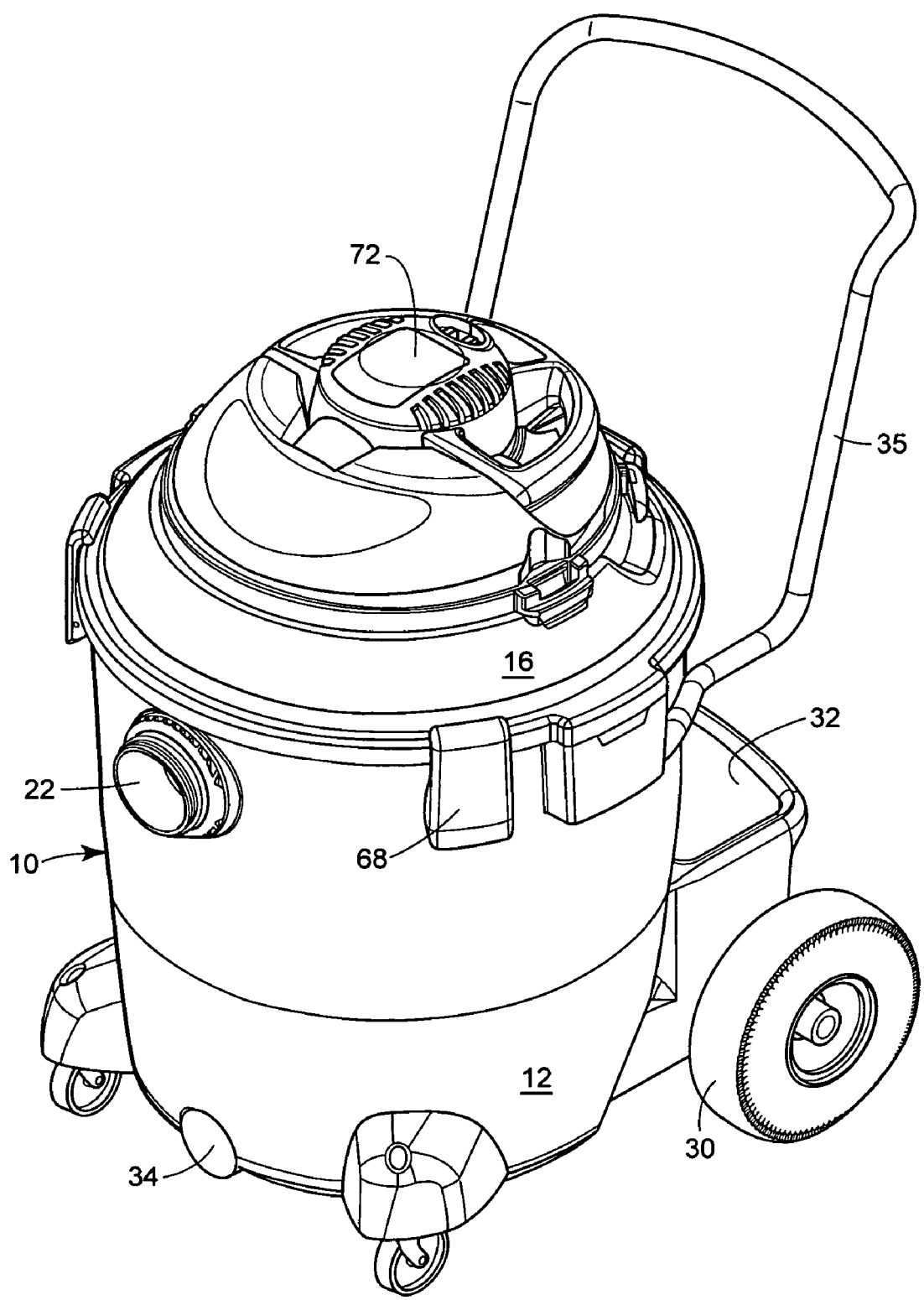
FIGS. 15-21 are views of the mulcher corresponding to FIGS. 1-8 but with the shredder assembly having been replaced by a basic head unit.
Figure 16:
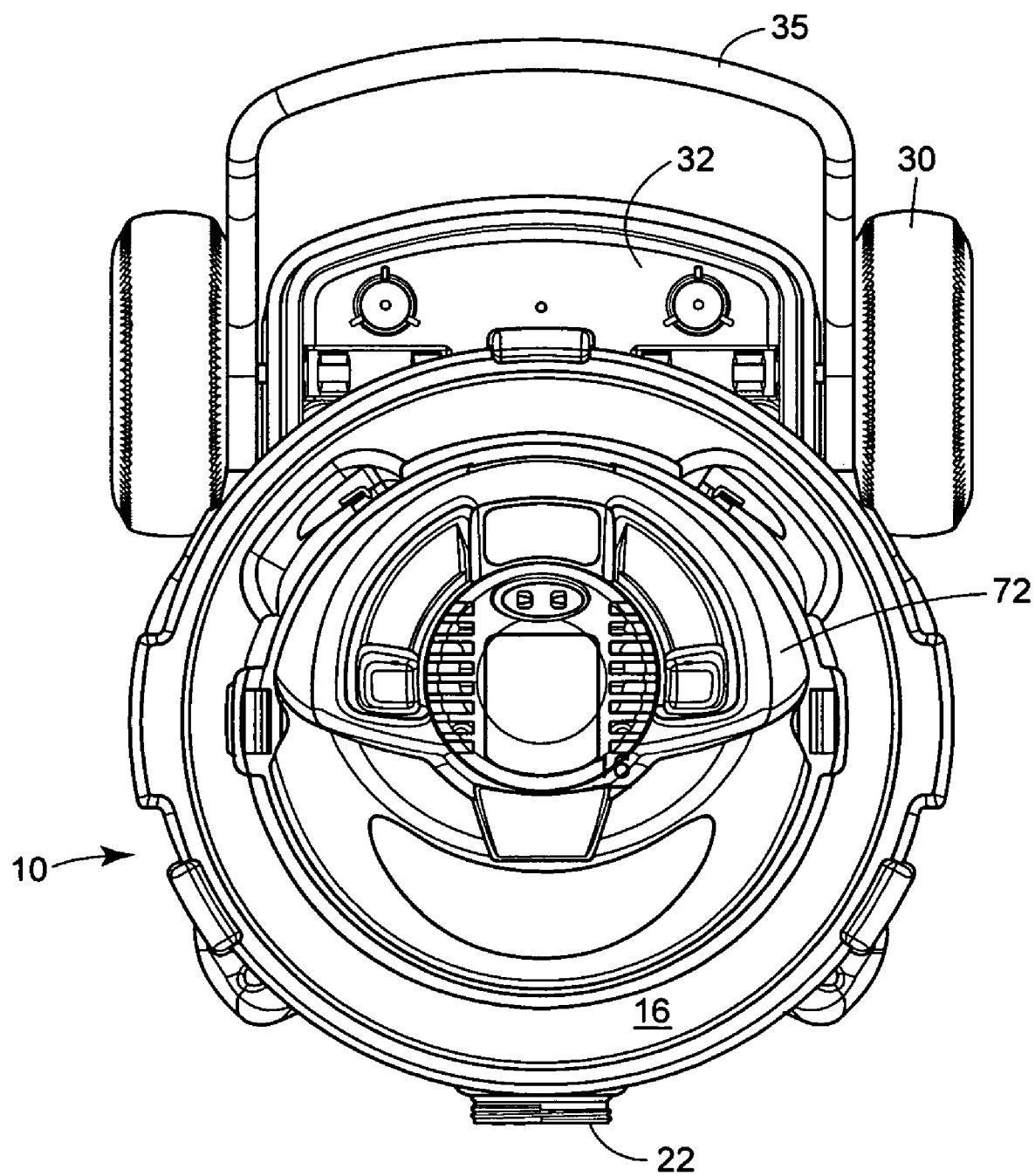
Figure 17:
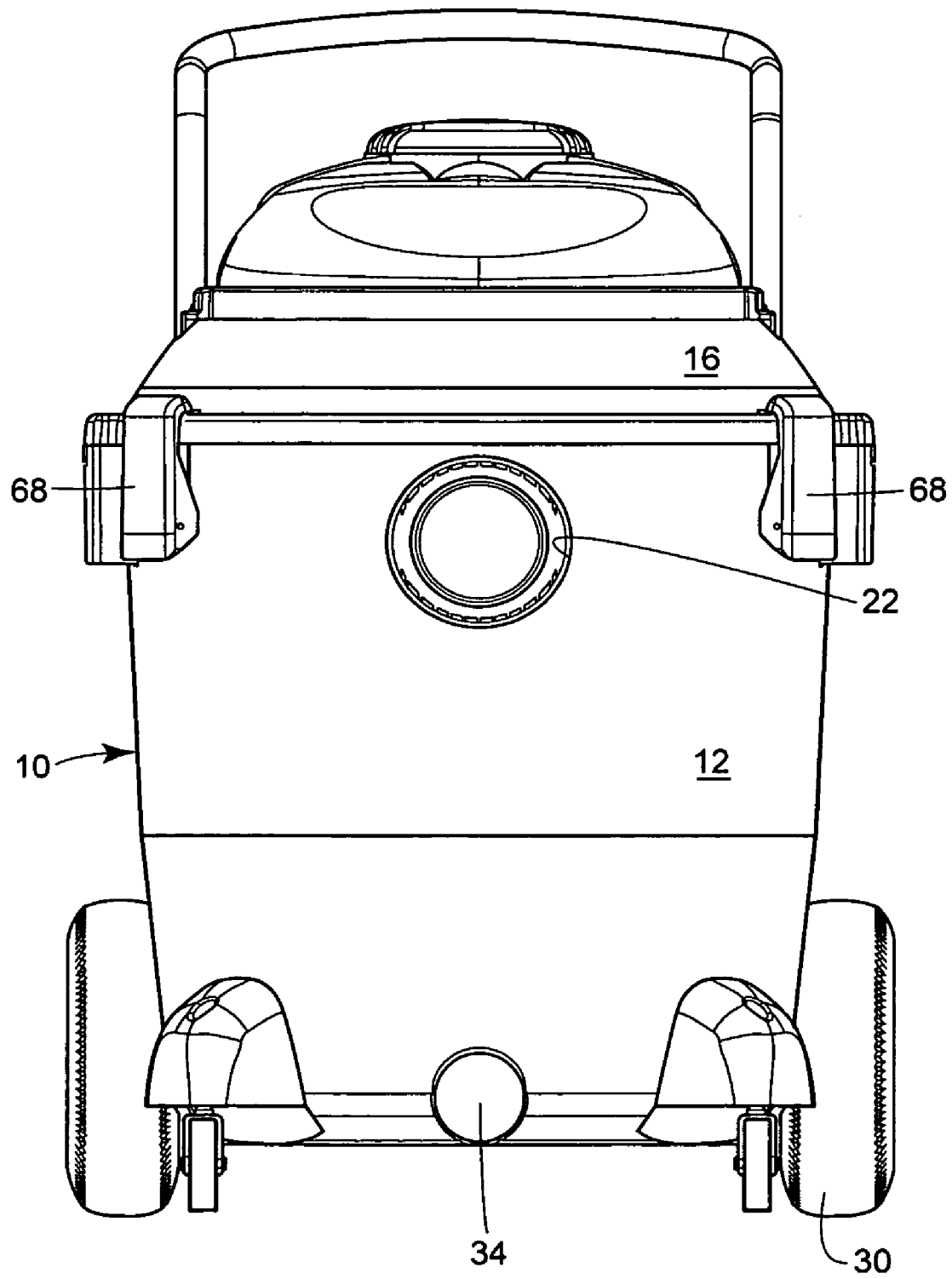
Figure 18:
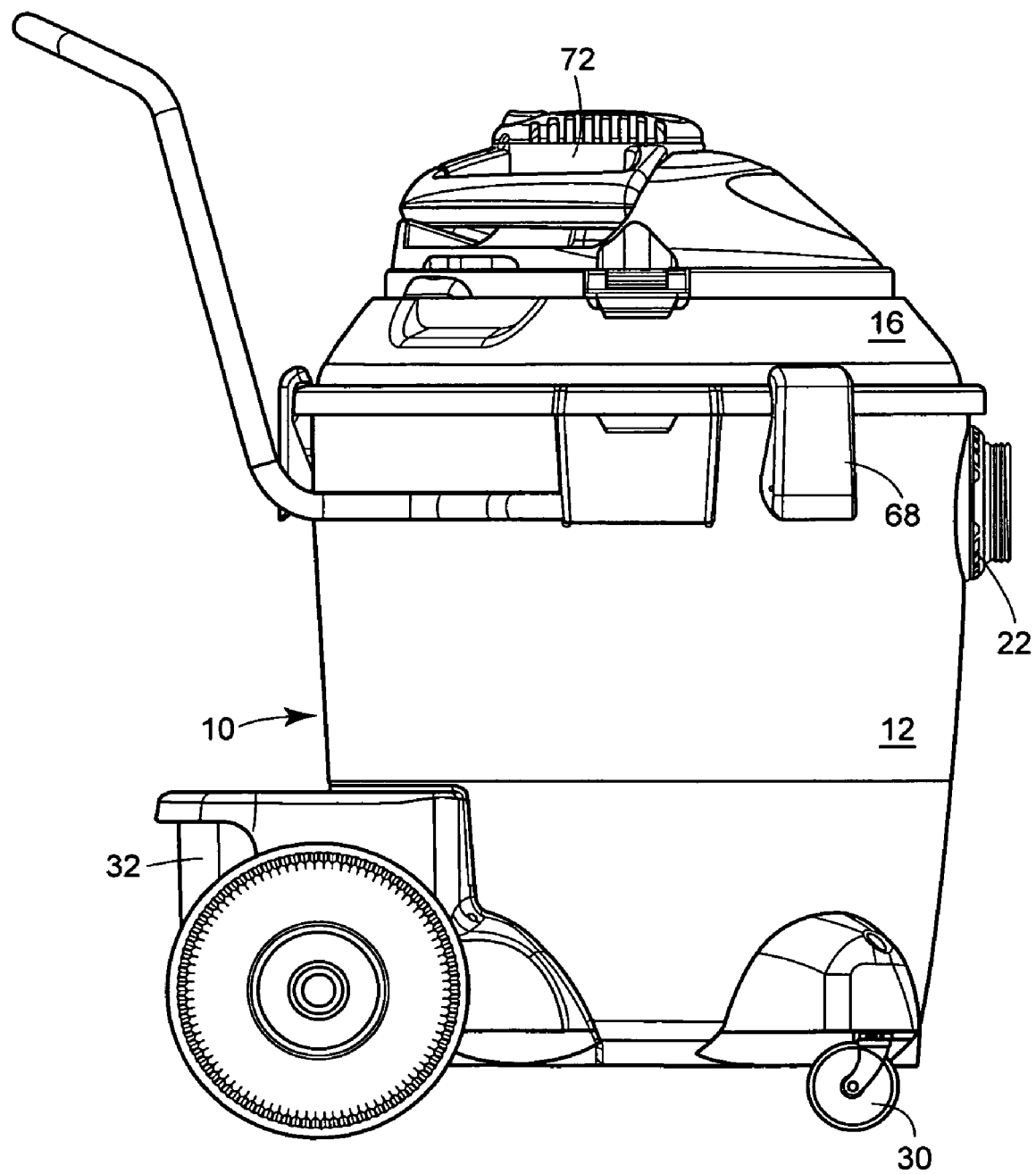
Figure 19:
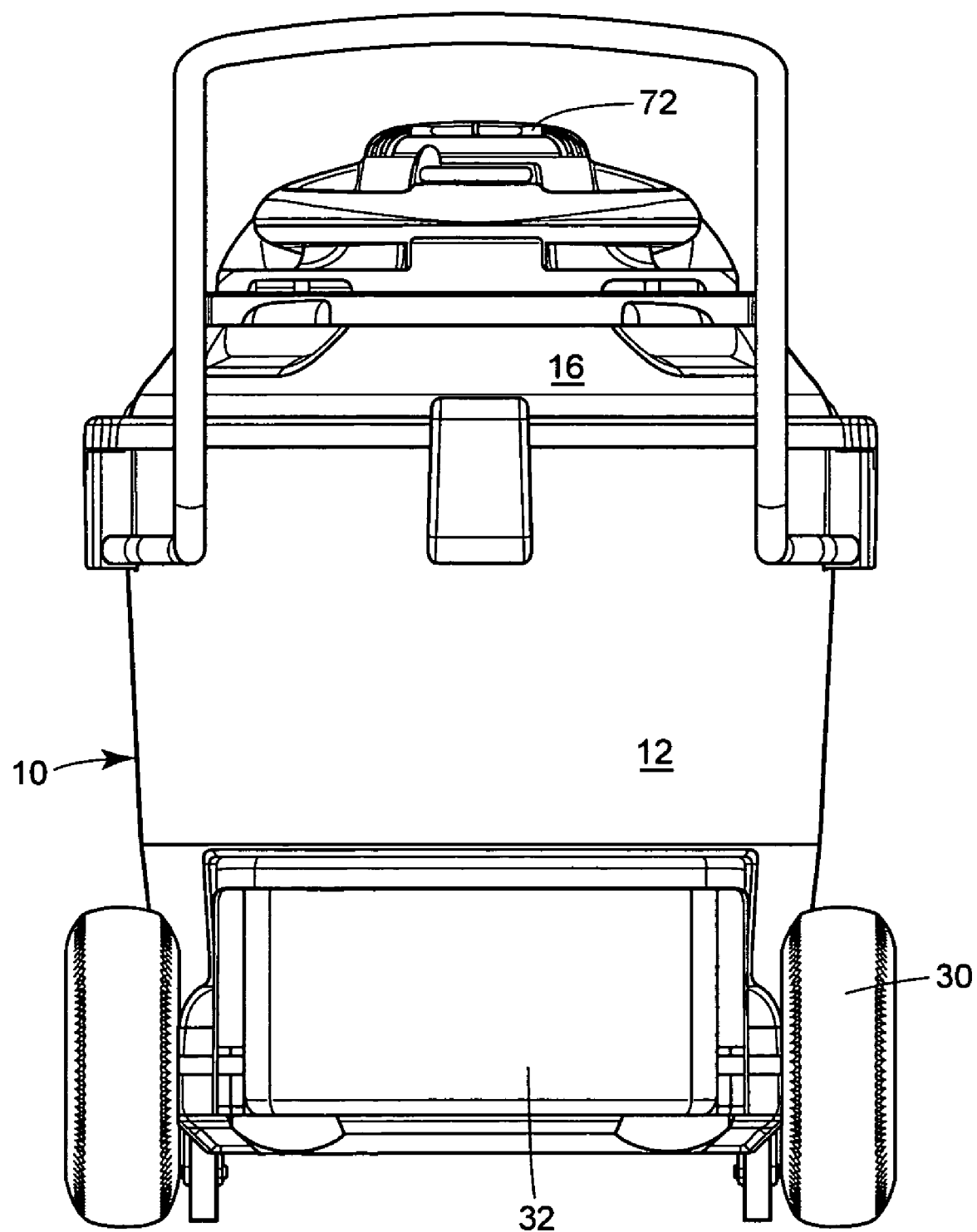
Figure 20:
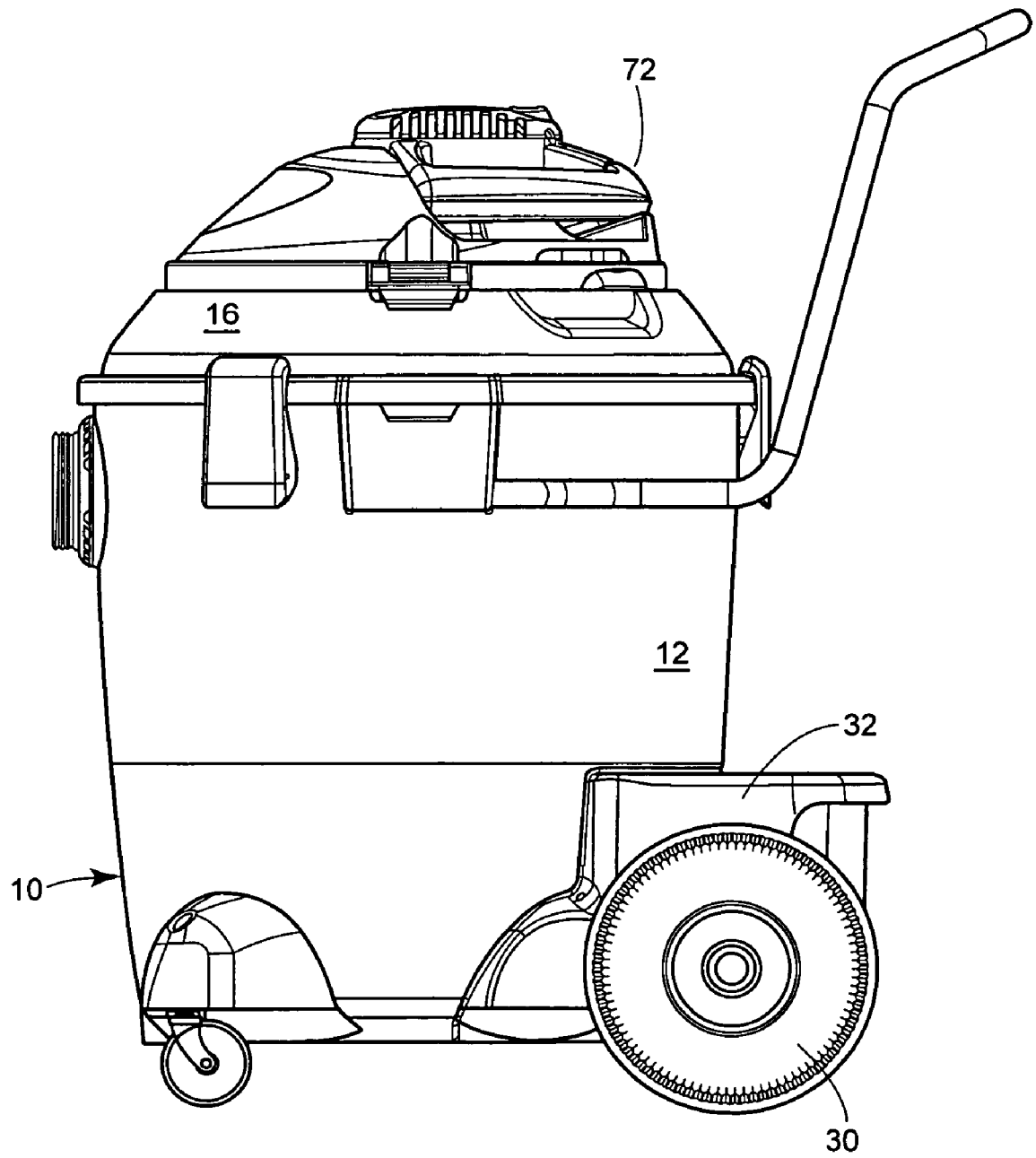
Figure 21:
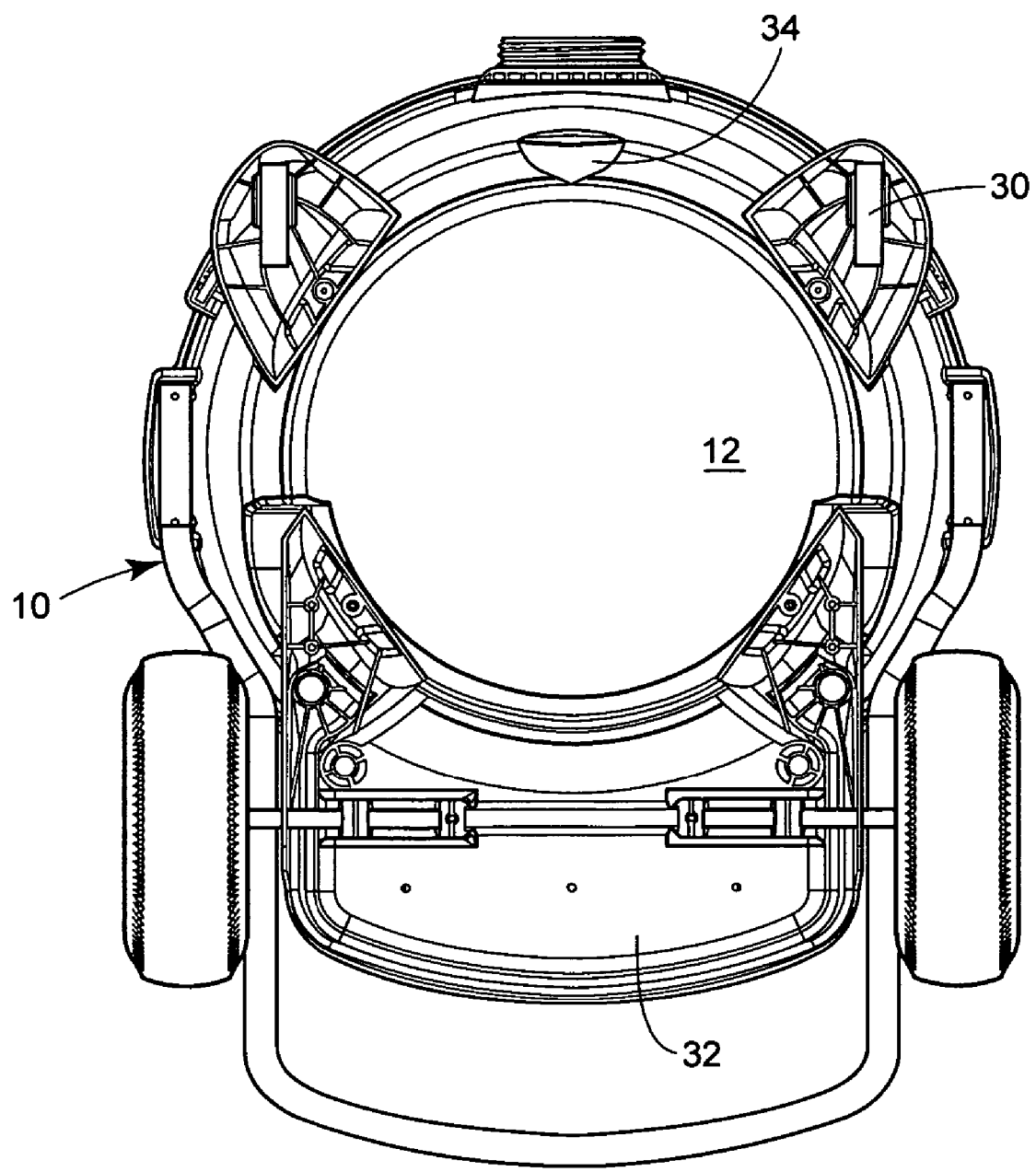
Figure 22:
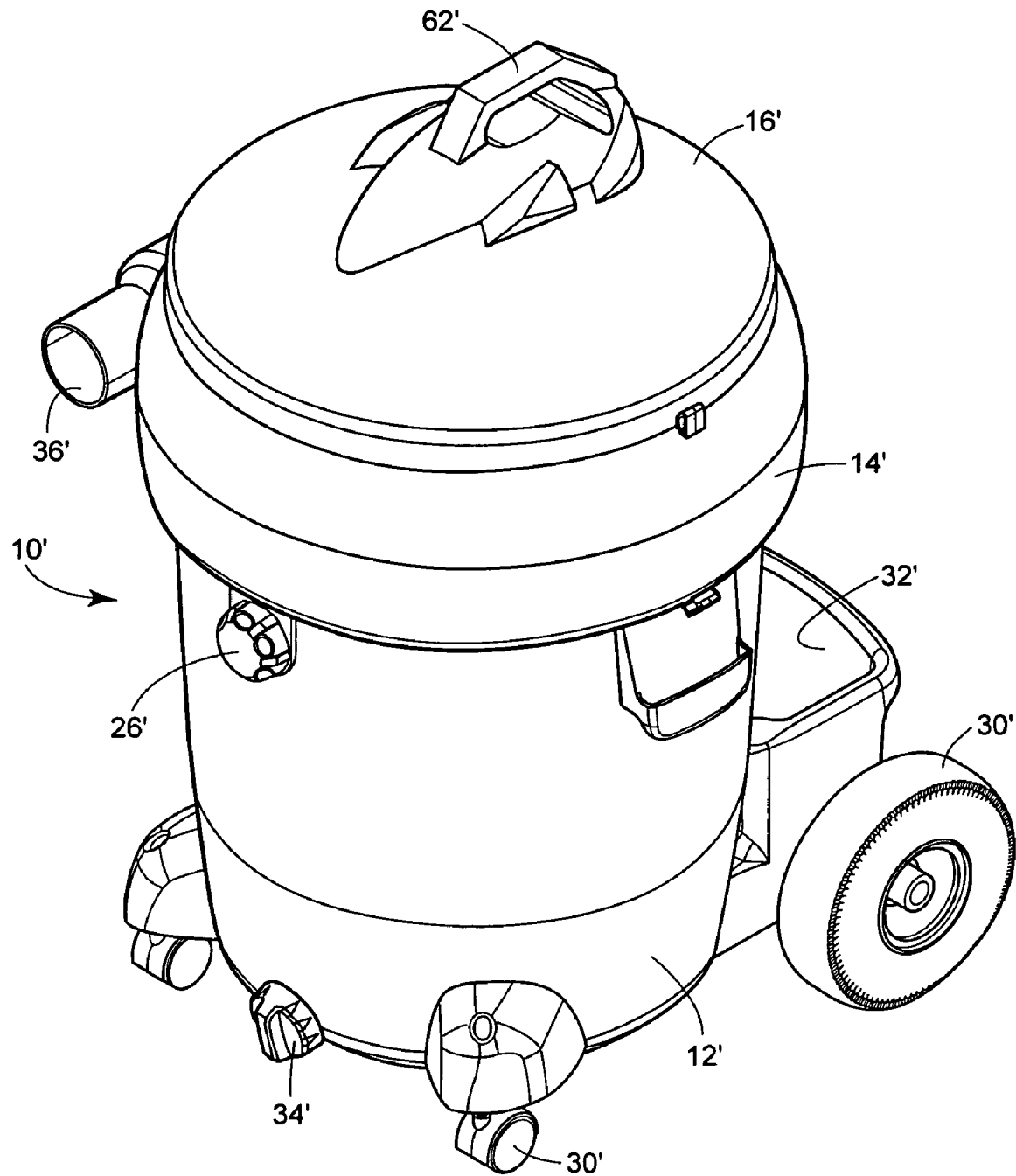
FIG. 22 is an isometric view of another embodiment of a mulcher that incorporates the new invention.
Figure 23:
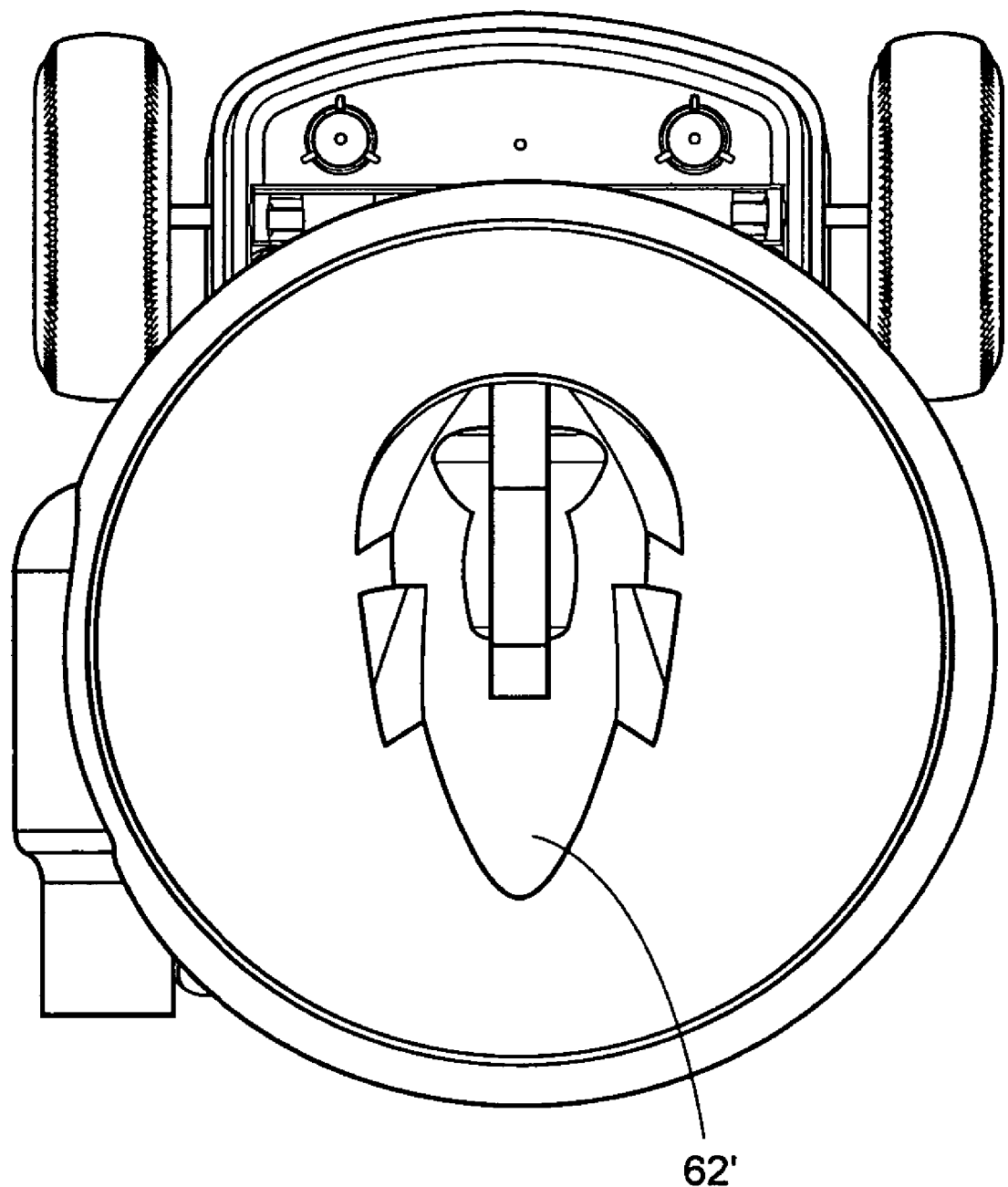
FIG. 23 is a top plan view of the mulcher of FIG. 22.
Figure 24:
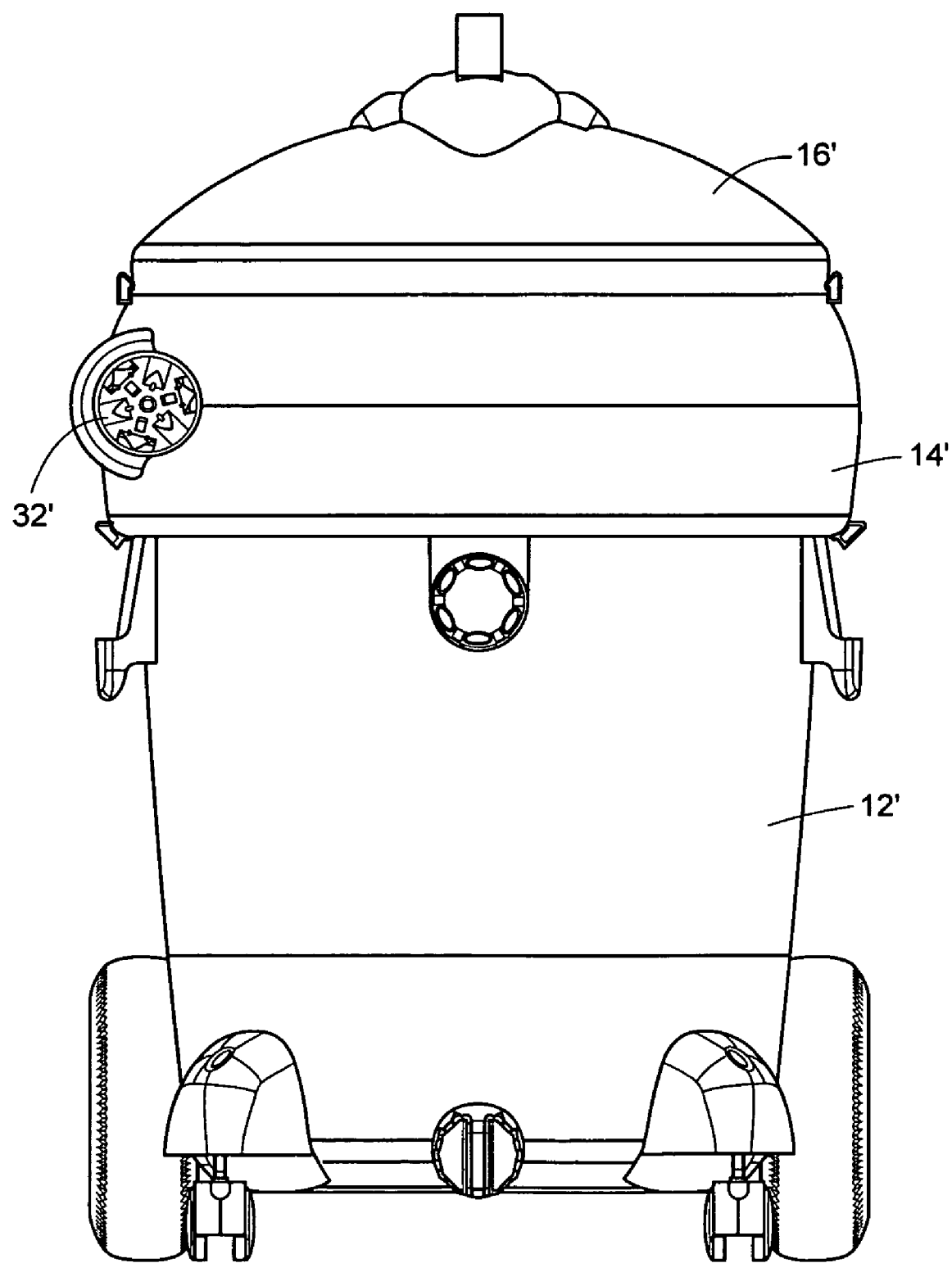
FIG. 24 is a front elevation view of that mulcher.
Figure 25:
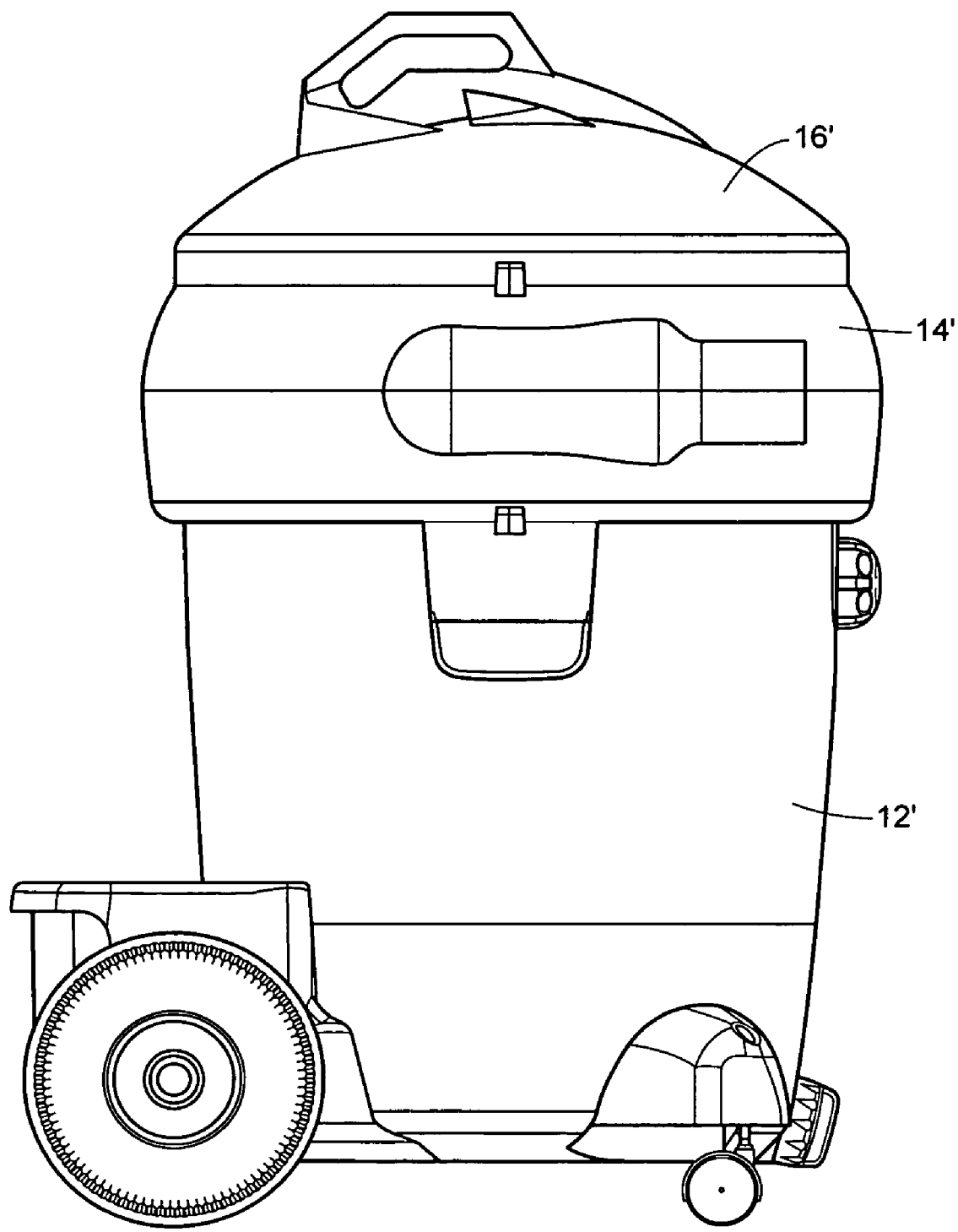
FIG. 25 is a left-side elevation view of that mulcher.
Figure 26:
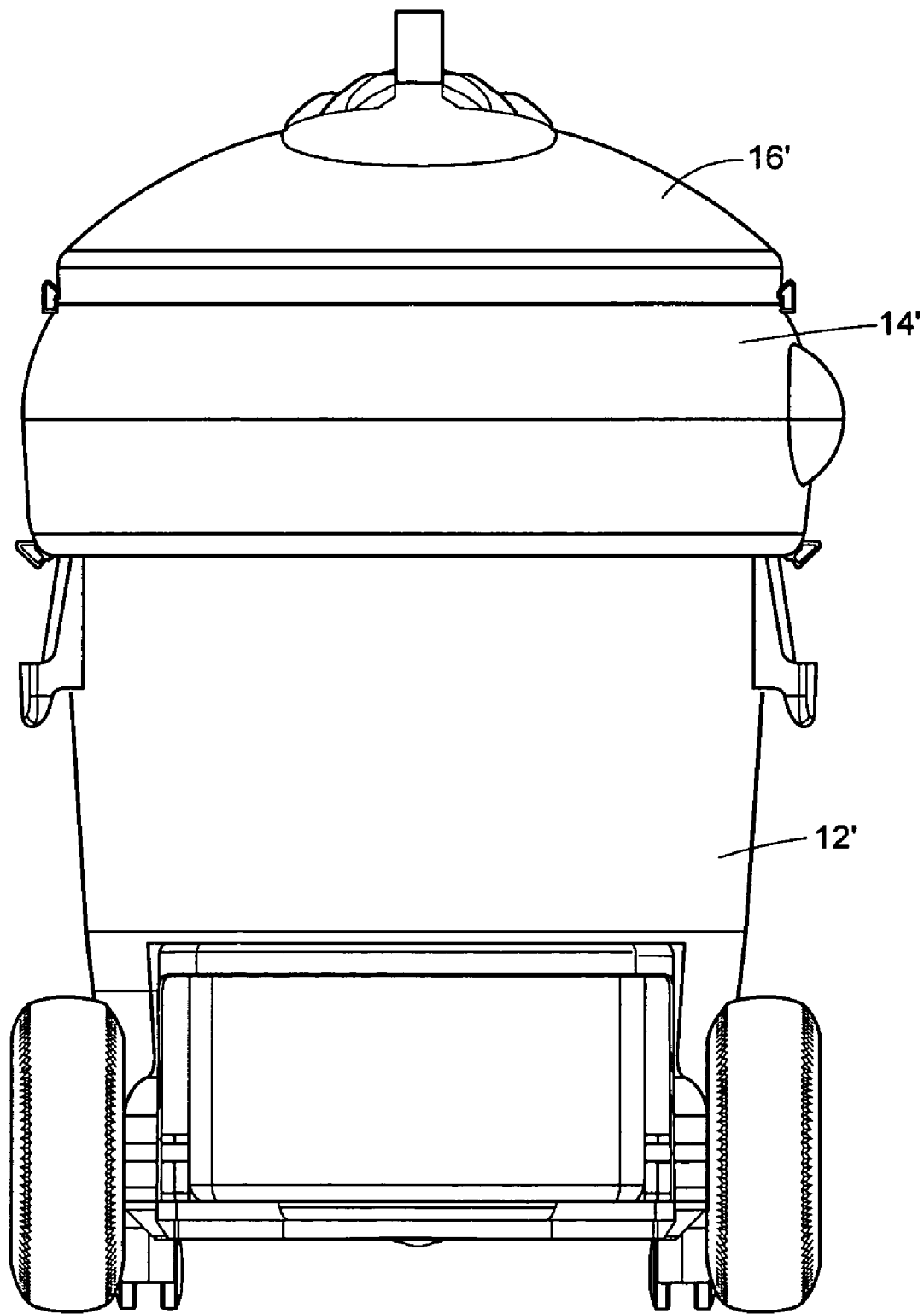
FIG. 26 is a back elevation view of that mulcher.
Figure 27:
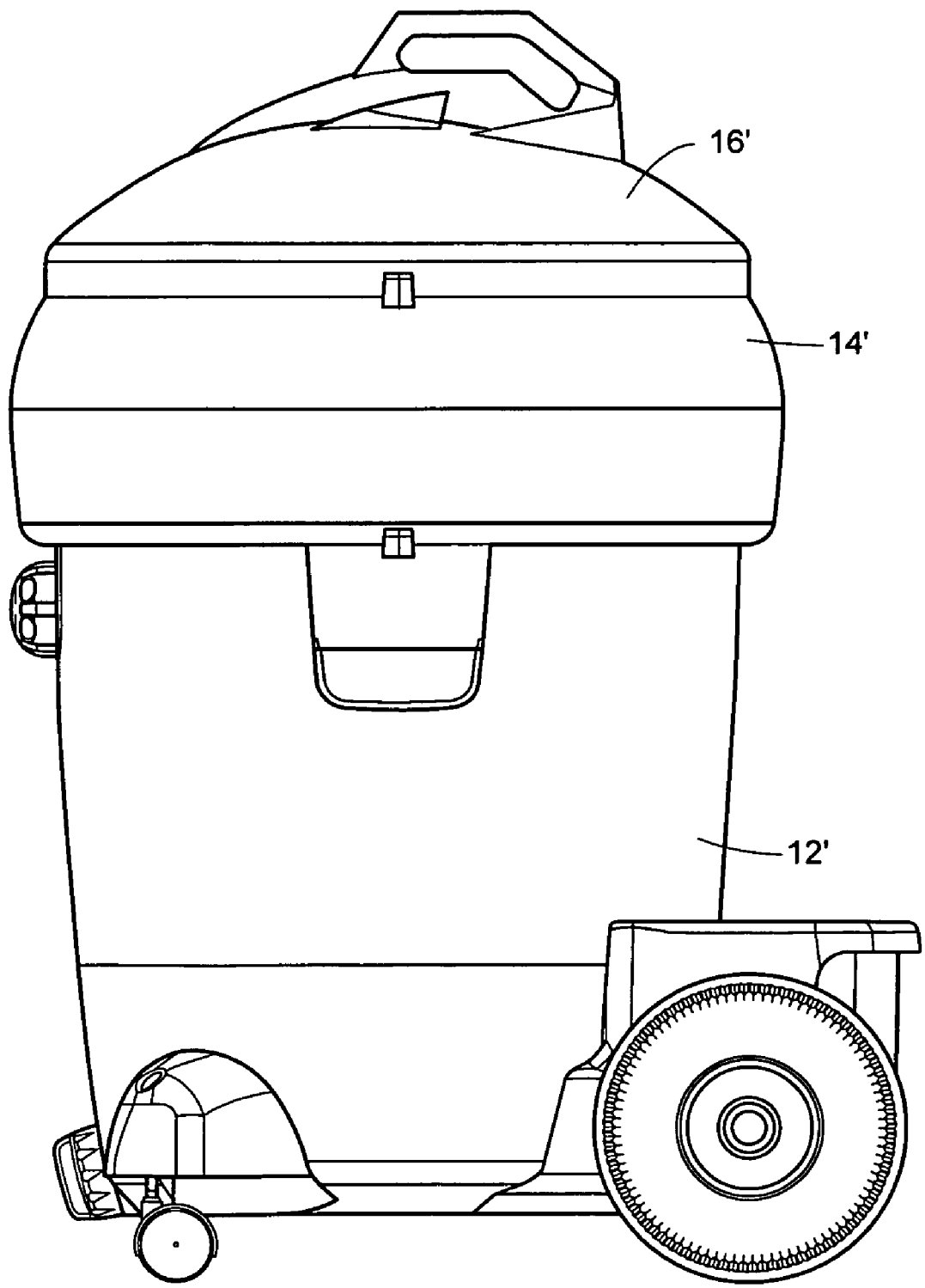
FIG. 27 is a right-side elevation view of that mulcher.
Figure 28:
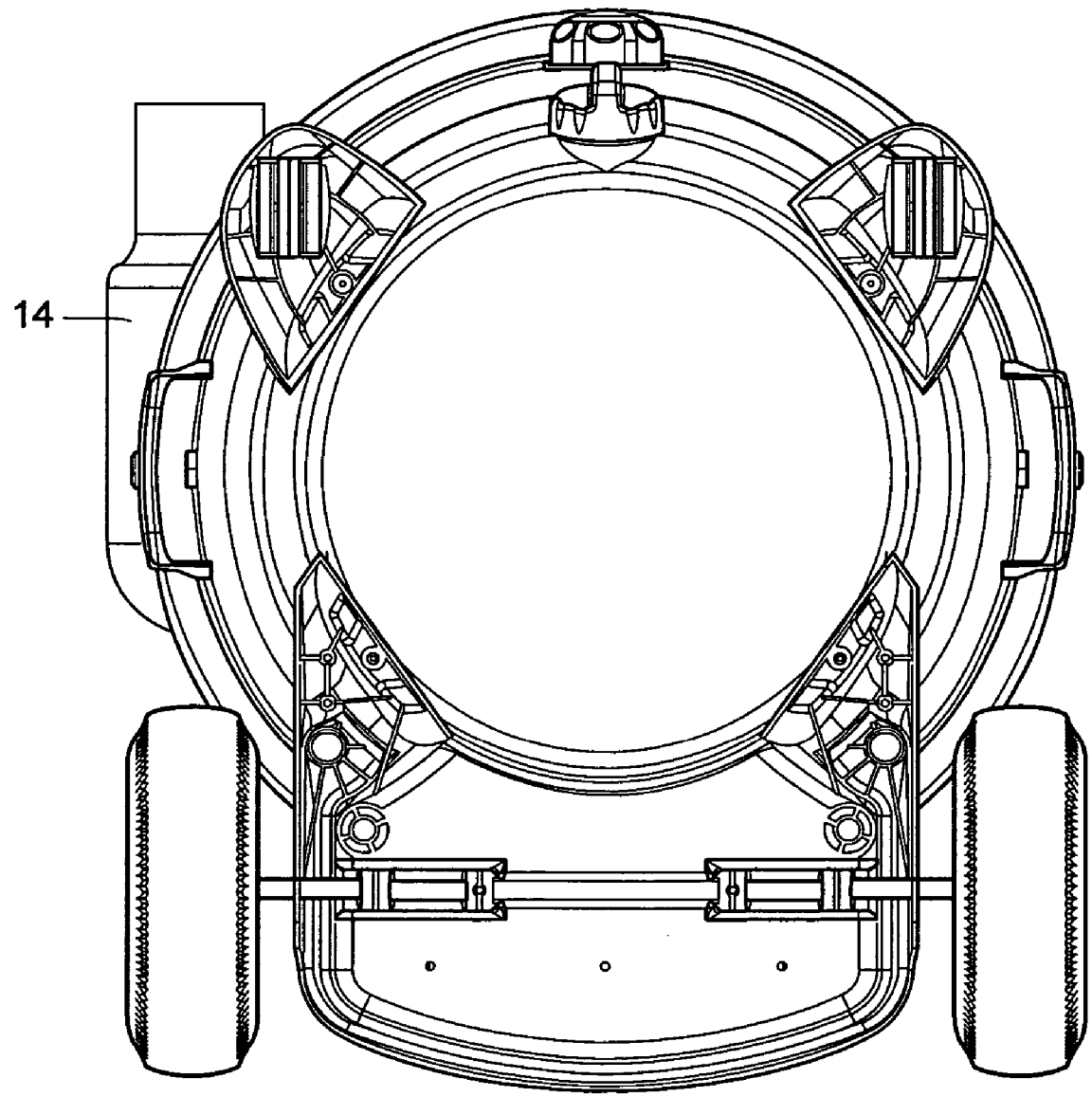
FIG. 28 is a bottom view of that mulcher.
Figure 29:
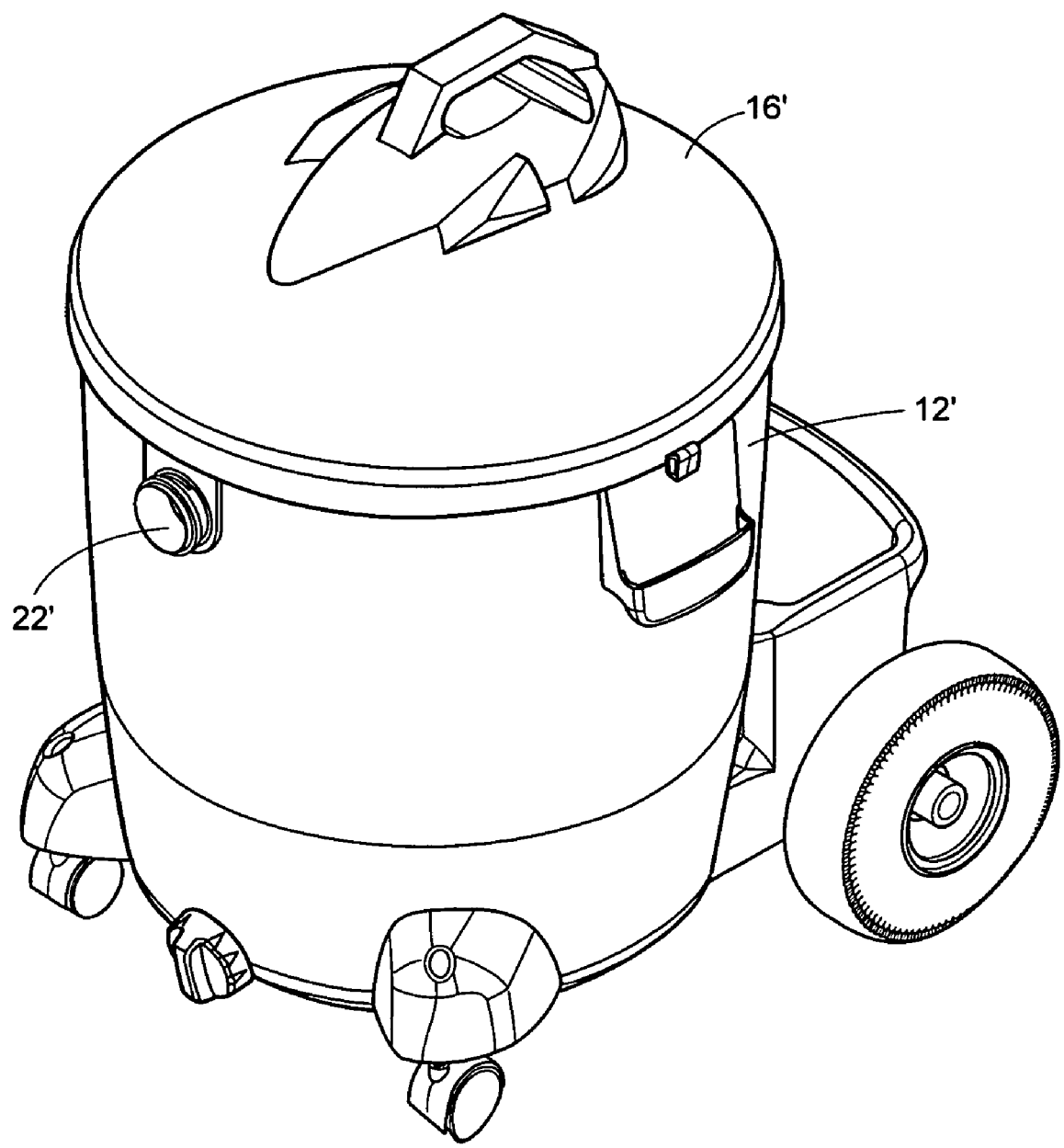
FIGS. 29-35 are views that correspond with FIGS. 22-28, but show the mulcher with the shredder assembly removed.
Figure 30:
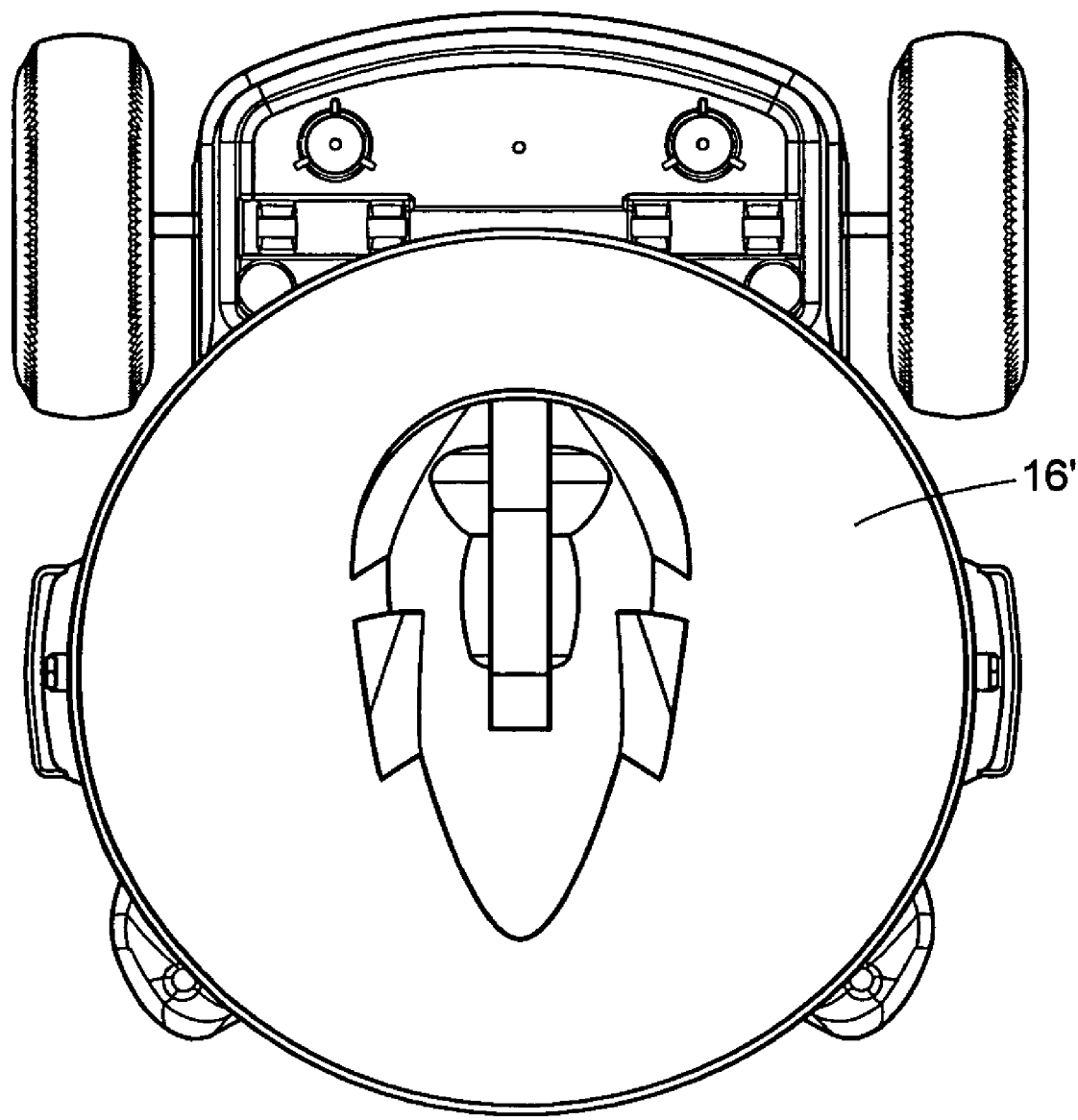
Figure 31:
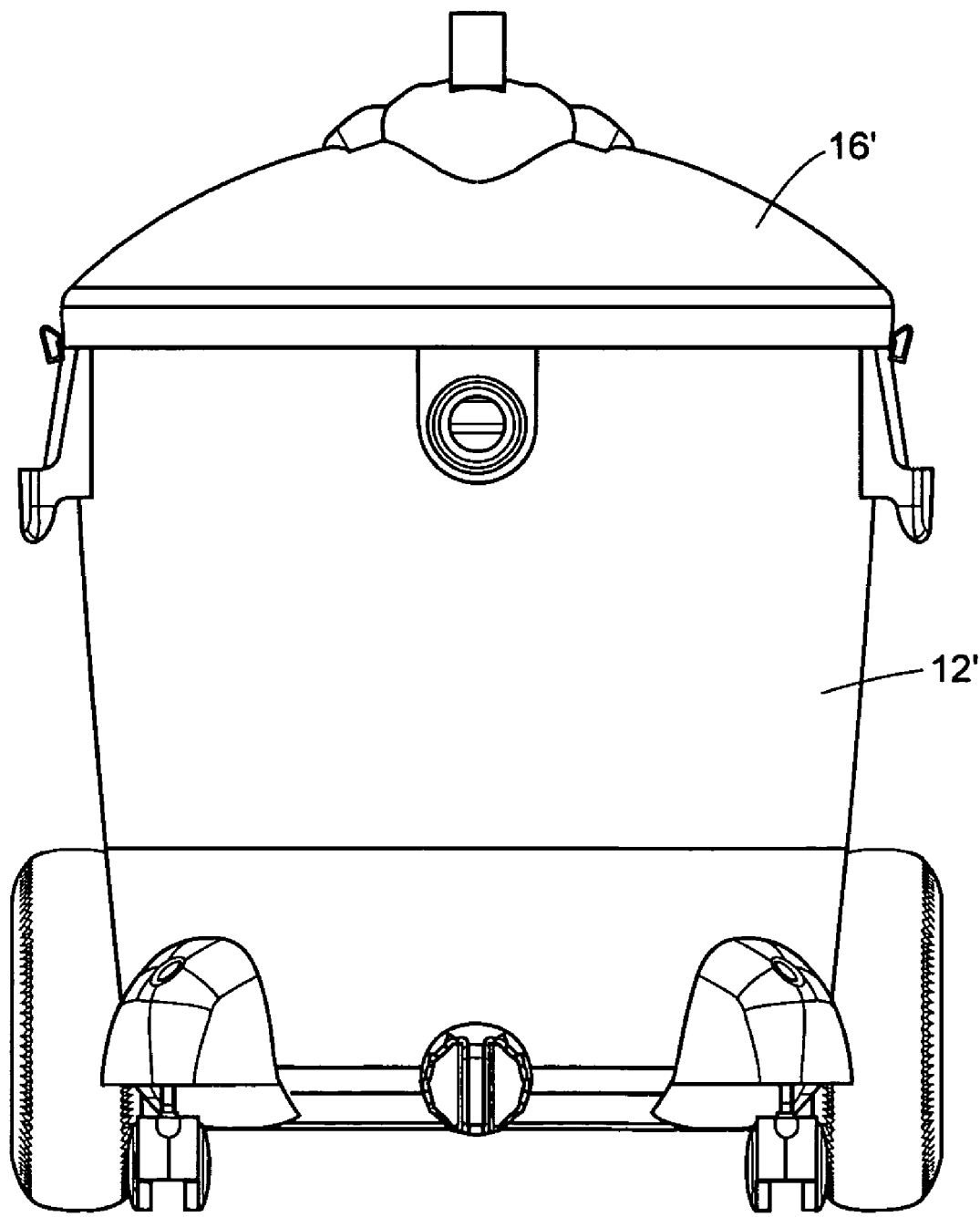
Figure 32:
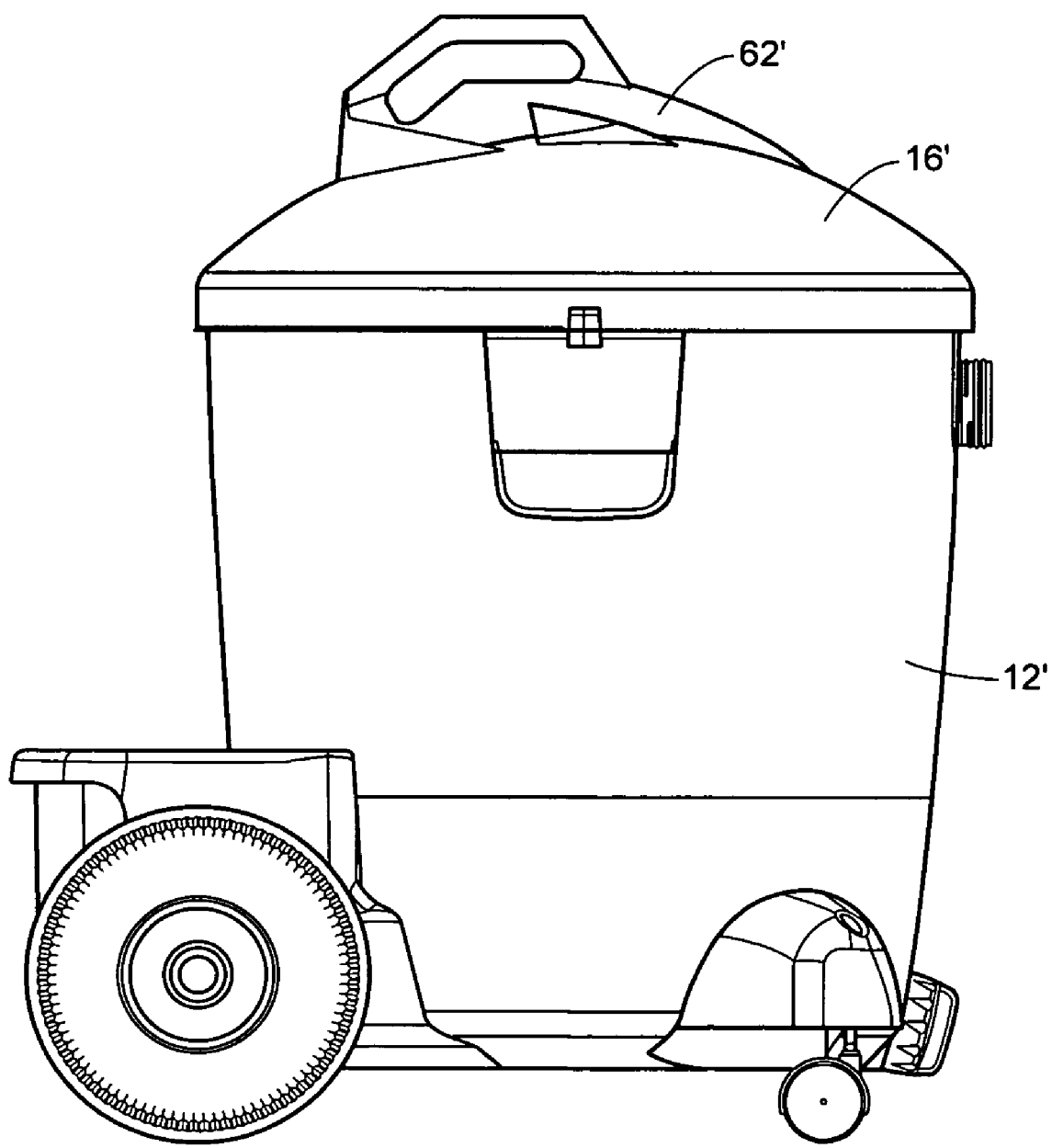
Figure 33:
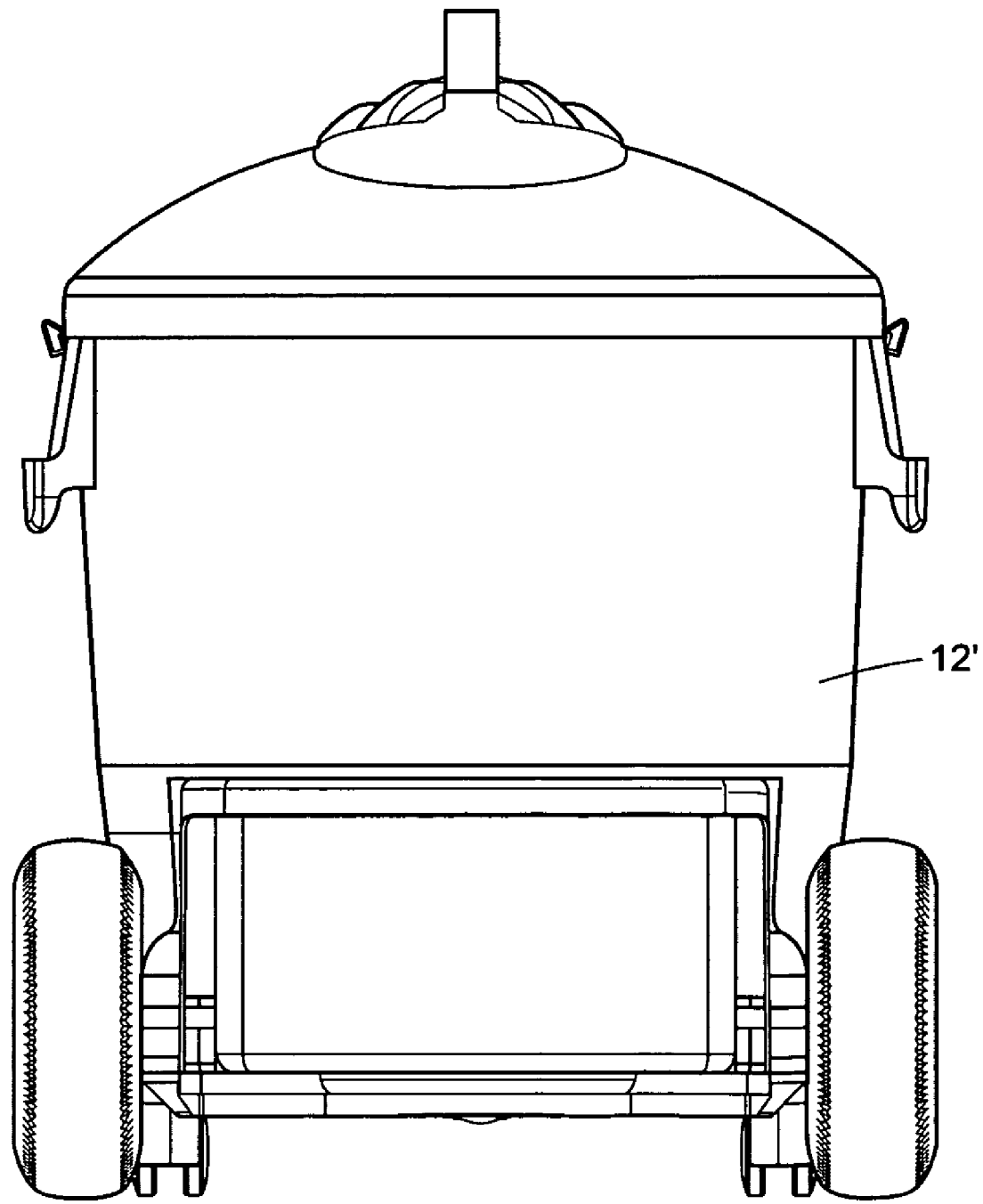
Figure 34:
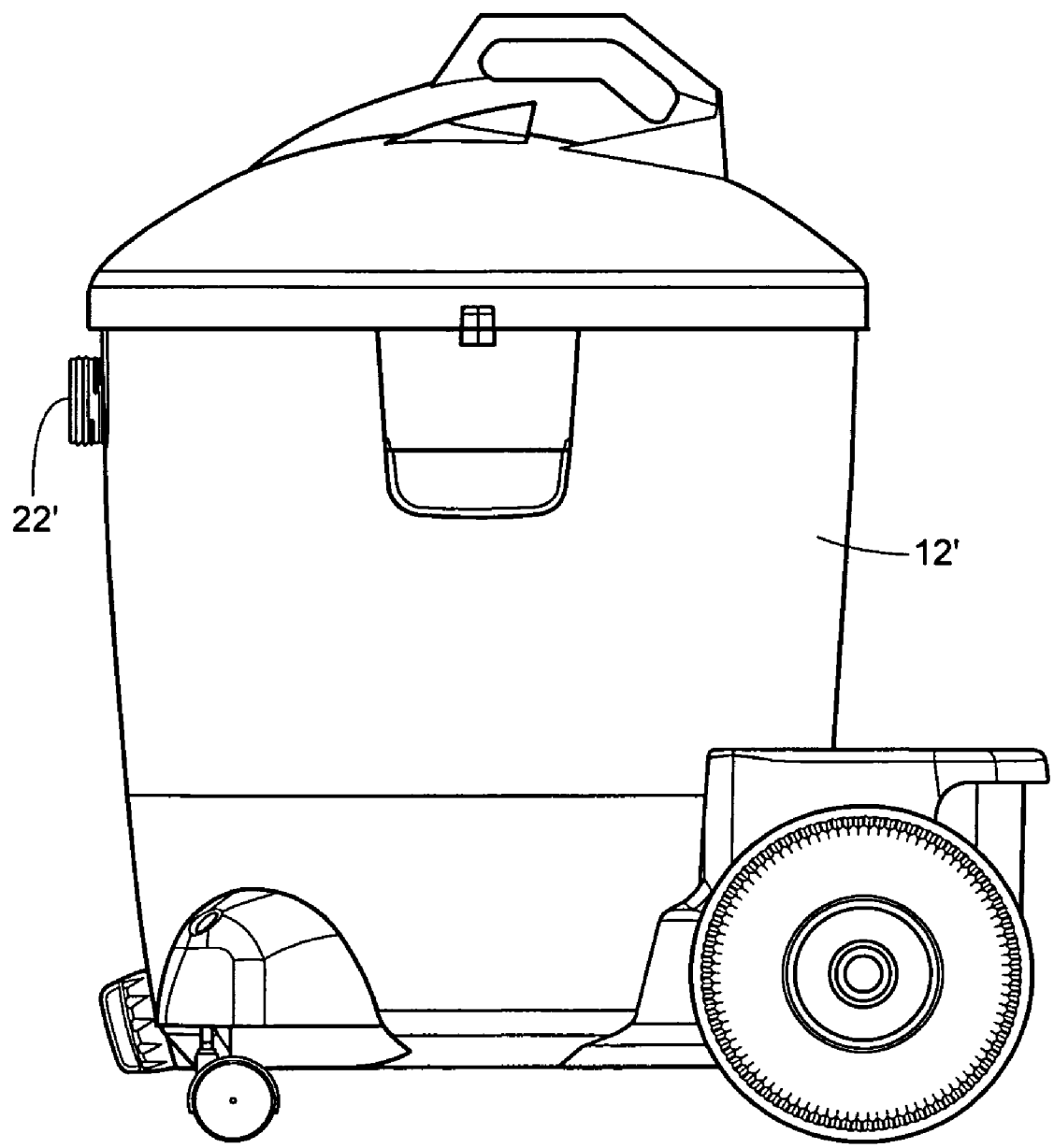
Figure 35:
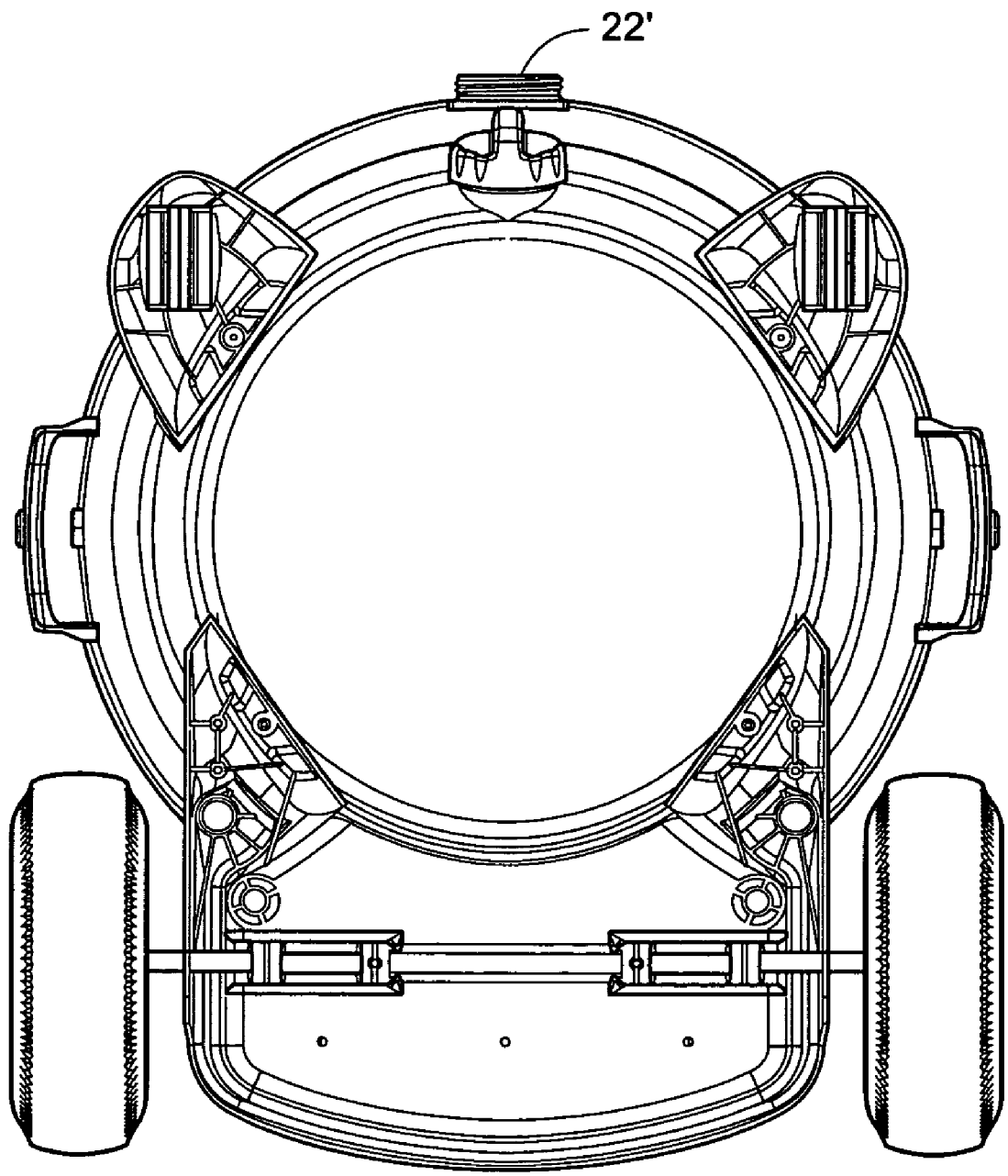
Figure 36:
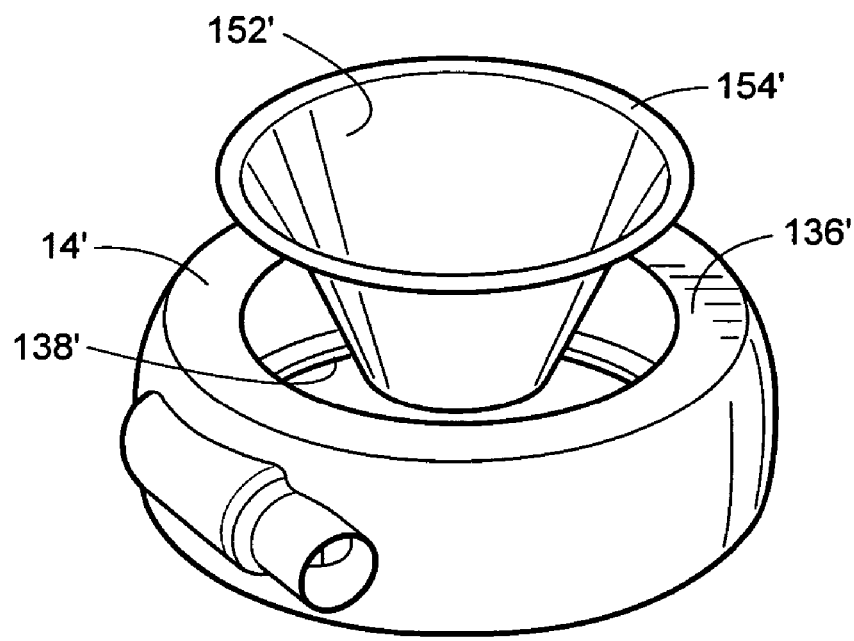
FIG. 36 is an exploded partial perspective view of the shredder assembly that is used with this embodiment of the invention, along with a conical filter.

For safety, special care has been taken to minimize the risk of misuse of the power module 37. As seen in FIGS. 11 and 13, a safety switch 50 is mounted to the illustrated power module. A cooperating blade 51 (best seen in FIGS. 9 and 10) is mounted to a frame 52 within the shredder assembly 14. Contact between the blade and the safety switch is needed for power to pass through the switch. When the power module is seated onto the receptacle 48, the blade contacts the safety switch, allowing power to pass through to the motor 39. Removing the power module from the receptacle breaks contact between the blade and the safety switch, disabling the motor. Similarly, if the frame is removed from the bottom of the shredder assembly, the blade loses contact with the safety switch and the power supply is shut off.

Figure 10:
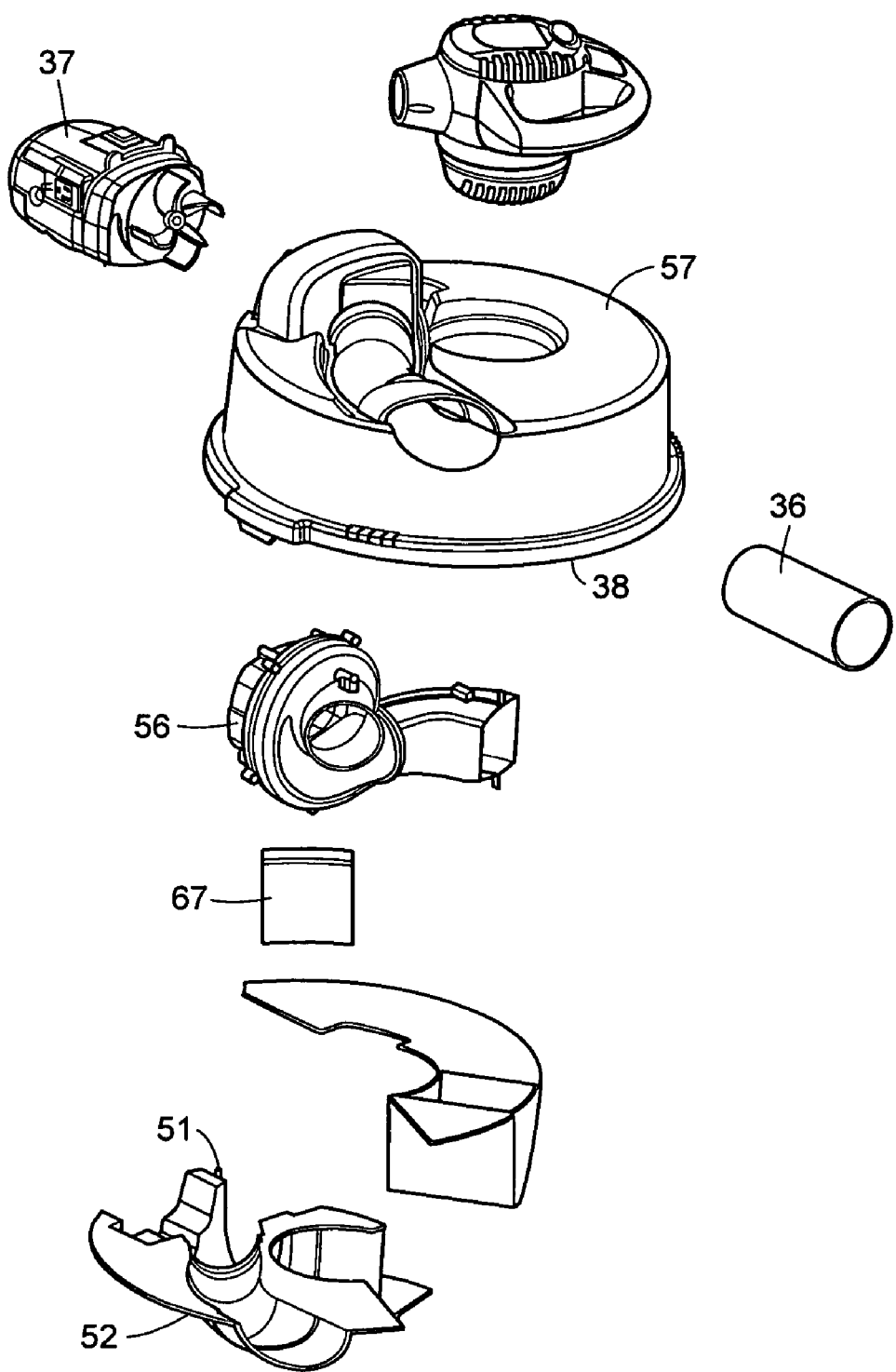

As suggested in FIGS. 9 and 10, when the power module 37 is seated onto the receptacle 48, the shredding blade 40 can spin within a mulcher housing 56 that is mounted within a cover 57 of the shredder assembly 14. The mulcher housing has a volute or similar arrangement that directs mulched material to a chamber outlet 58. Directional walls 59 are connected to the chamber outlet, and steer mulched debris and air that is ejected from the mulcher housing into a tangential path around an annular skirt wall 60 of the cover. While proceeding along that path, heavy debris falls into the storage reservoir in the base unit 12. A downwardly directed segment 61 at the end of a deflector 62 helps assure that lighter debris is also directed to the base unit.

The illustrated shredder assembly 14 does not require a filter. As can be understood from FIG. 14, the skirt wall 60, a lower wall 63 on the frame 52, a vertical rear wall 64 on the frame, and an annular inner wall 65 on the frame form a channel around the exterior of the directional walls 59. This channel leads to the sole exhaust port 66 on the shredder assembly, and forces large particles of debris in the unit to double back against the flow of air exiting the downstream end of the directional walls before they can reach the exhaust port. (As mentioned previously, the port 22 on the base unit 12 can be sealed with a cap when the shredder assembly is in use.) It is believed that the high-speed airflow exiting the directional walls will help to knock any large particles from the airflow heading in the opposite direction (toward the exhaust port), helping to reduce or eliminate the need for a separate filter.

In the illustrated device, small holes are shown in the lower wall 63. These holes can help reduce pressure within the storage reservoir by permitting some air to exit the device without doubling back against the flow of air from the directional walls 59. The small size of the holes prevents large particles from taking this path. A solid wall (with no apertures) can also be used.

Figure 1:
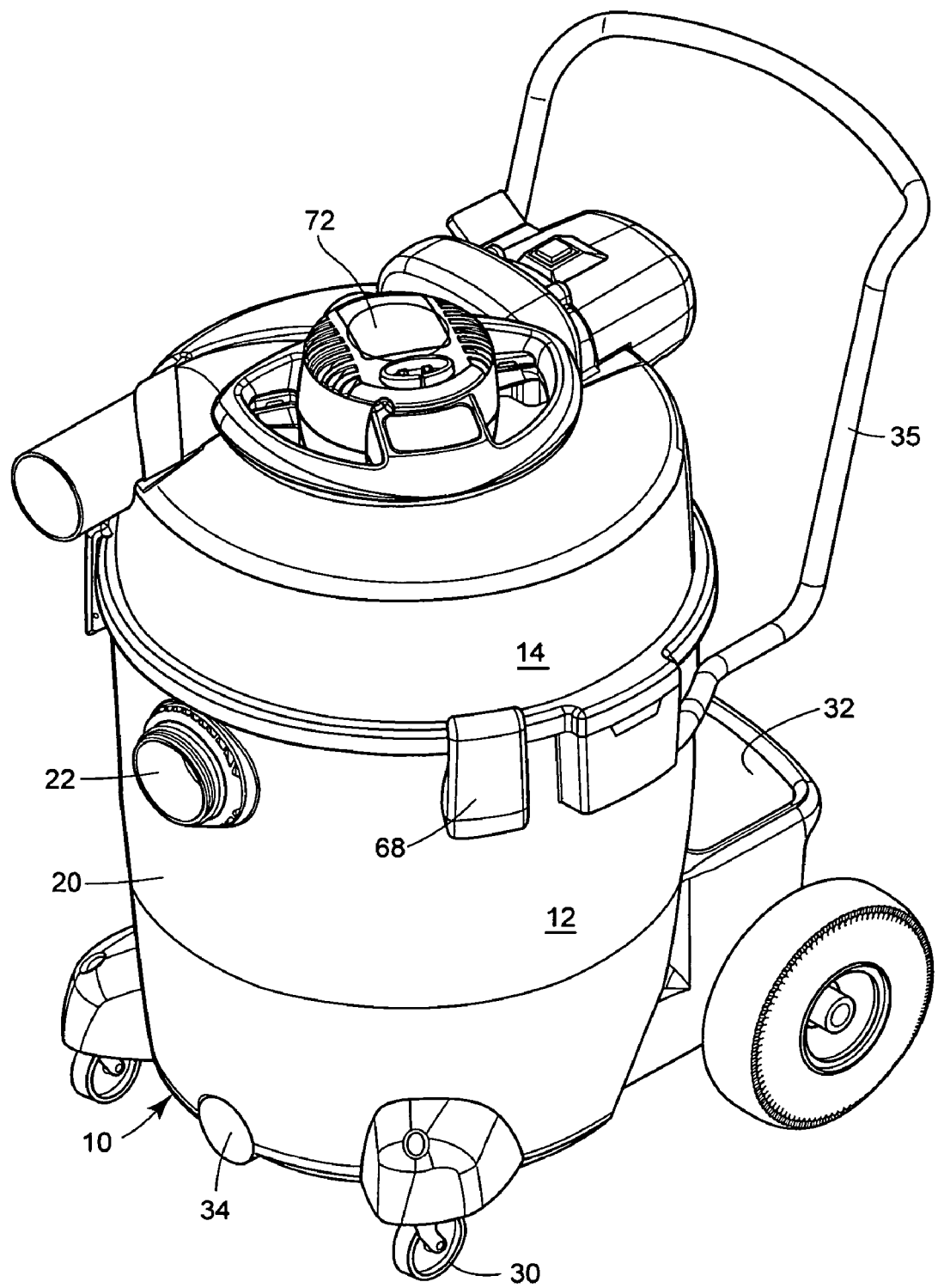
FIG. 1 is an isometric view of one embodiment of a mulcher that incorporates the new invention.
Figure 2:
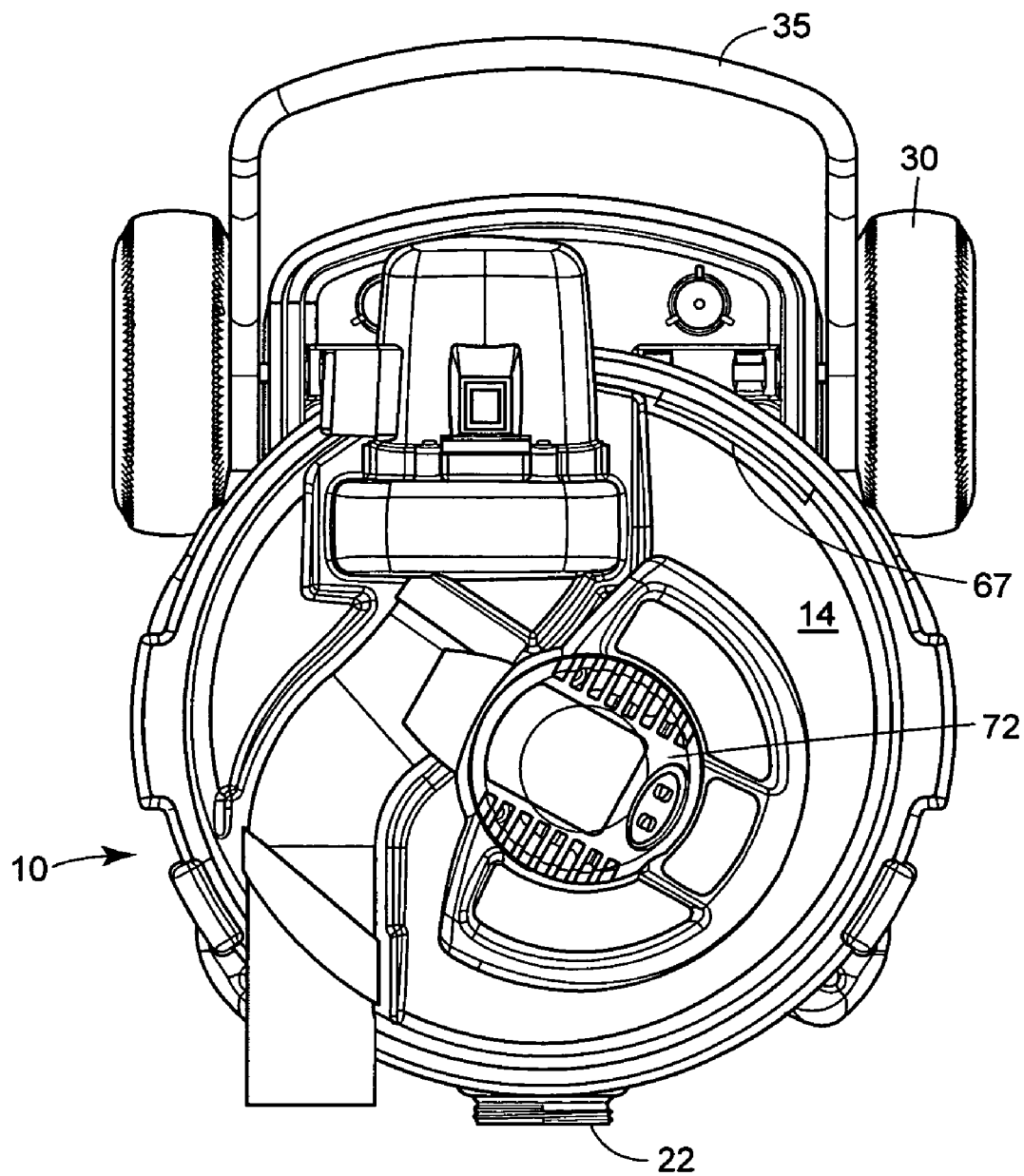
FIG. 2 is a top plan view of the mulcher.
Figure 3:
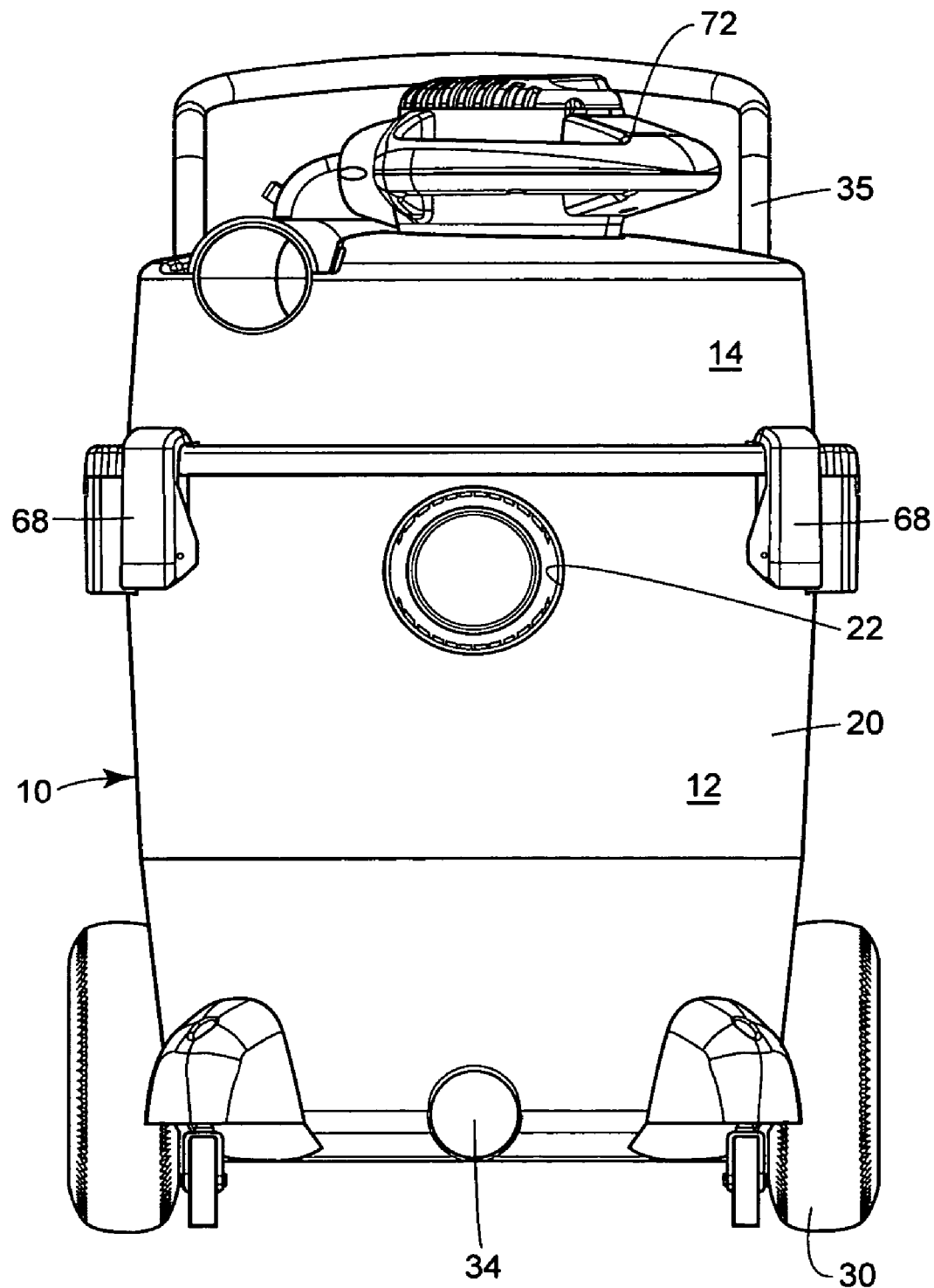
FIG. 3 is a front elevation view of the mulcher.
Figure 4:
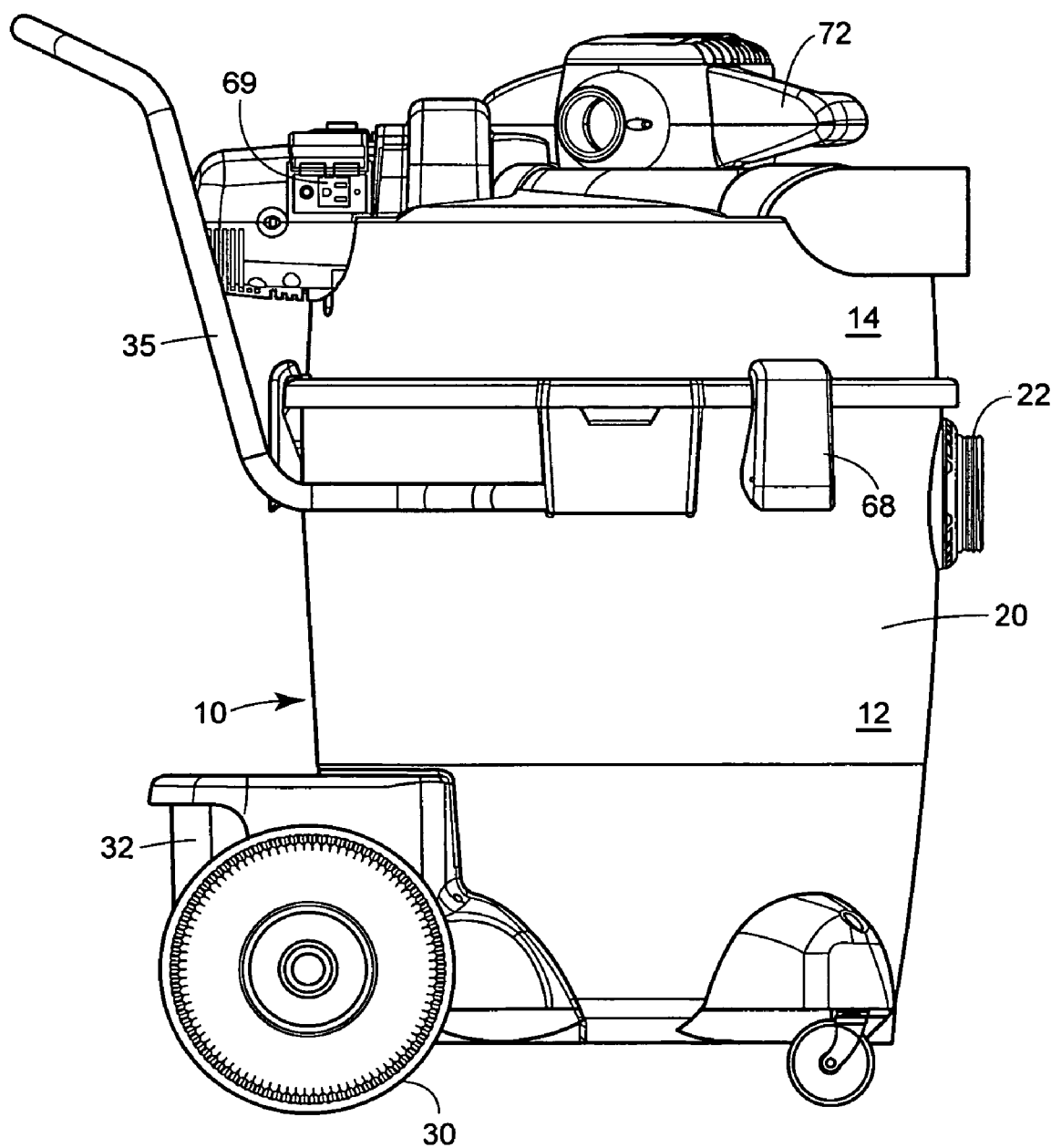
FIG. 4 is a left-side elevation view of the mulcher.
Figure 5:
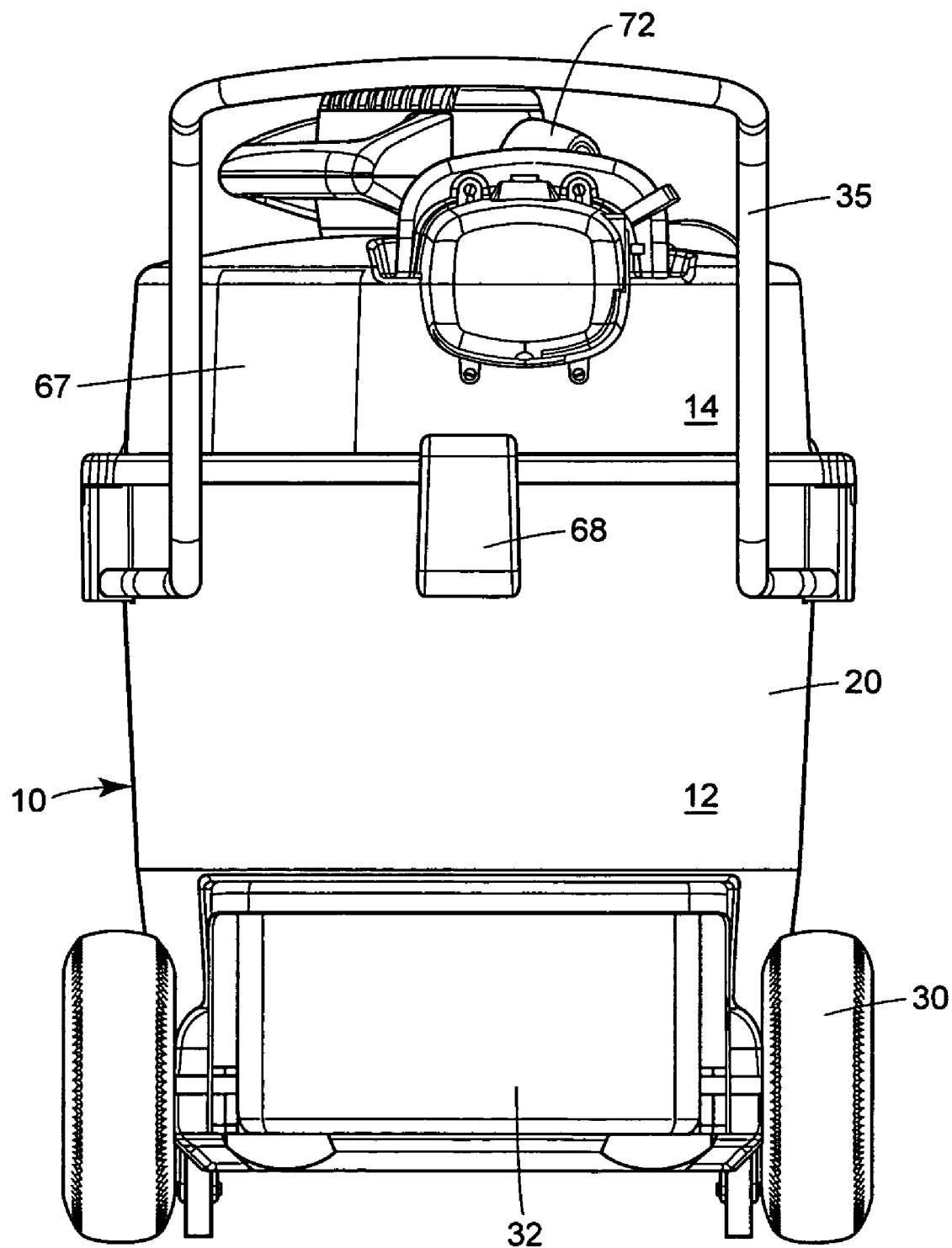
FIG. 5 is a back elevation view of the mulcher.
Figure 6:
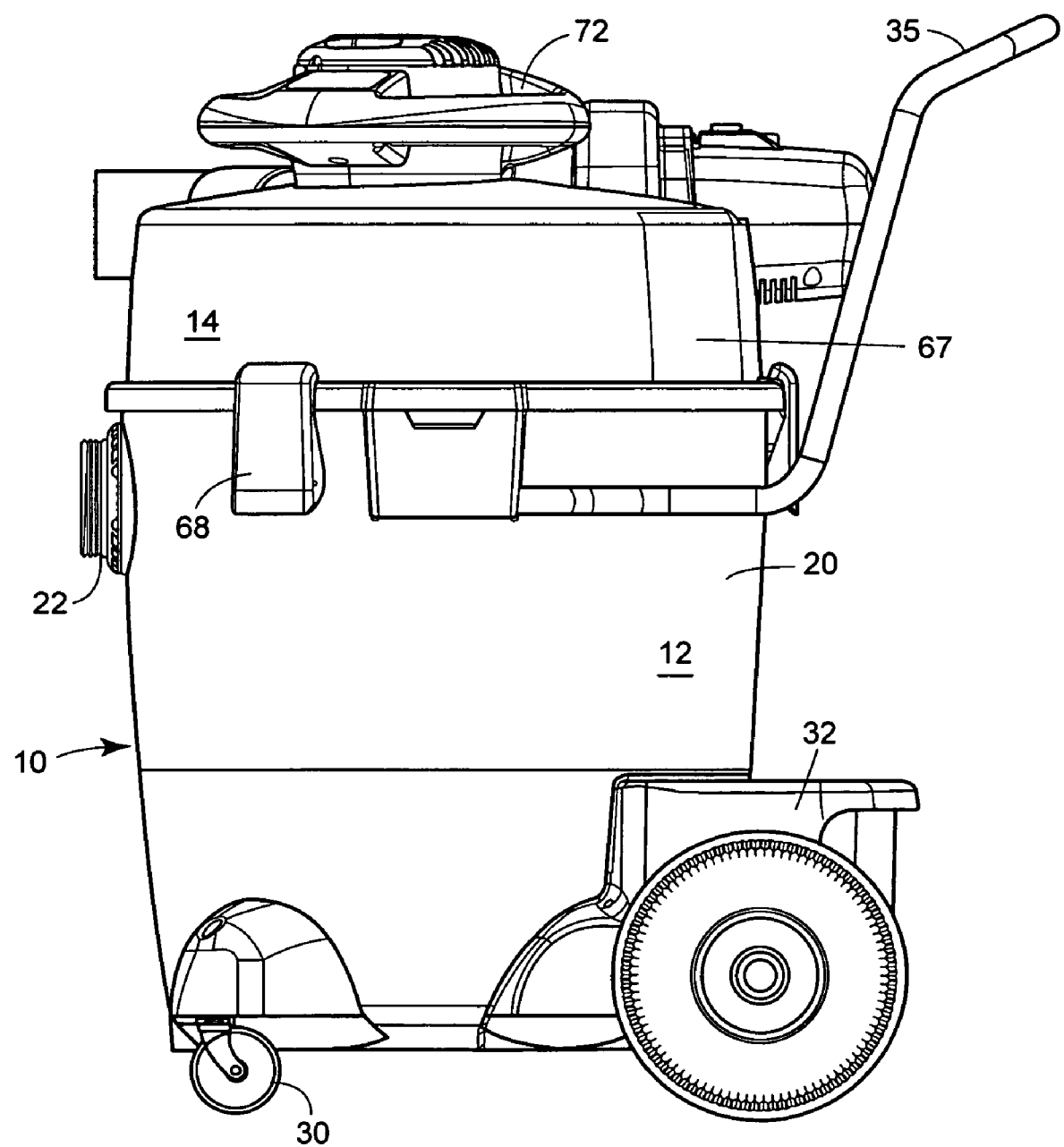
FIG. 6 is a right-side elevation view of the mulcher.
Figure 7:
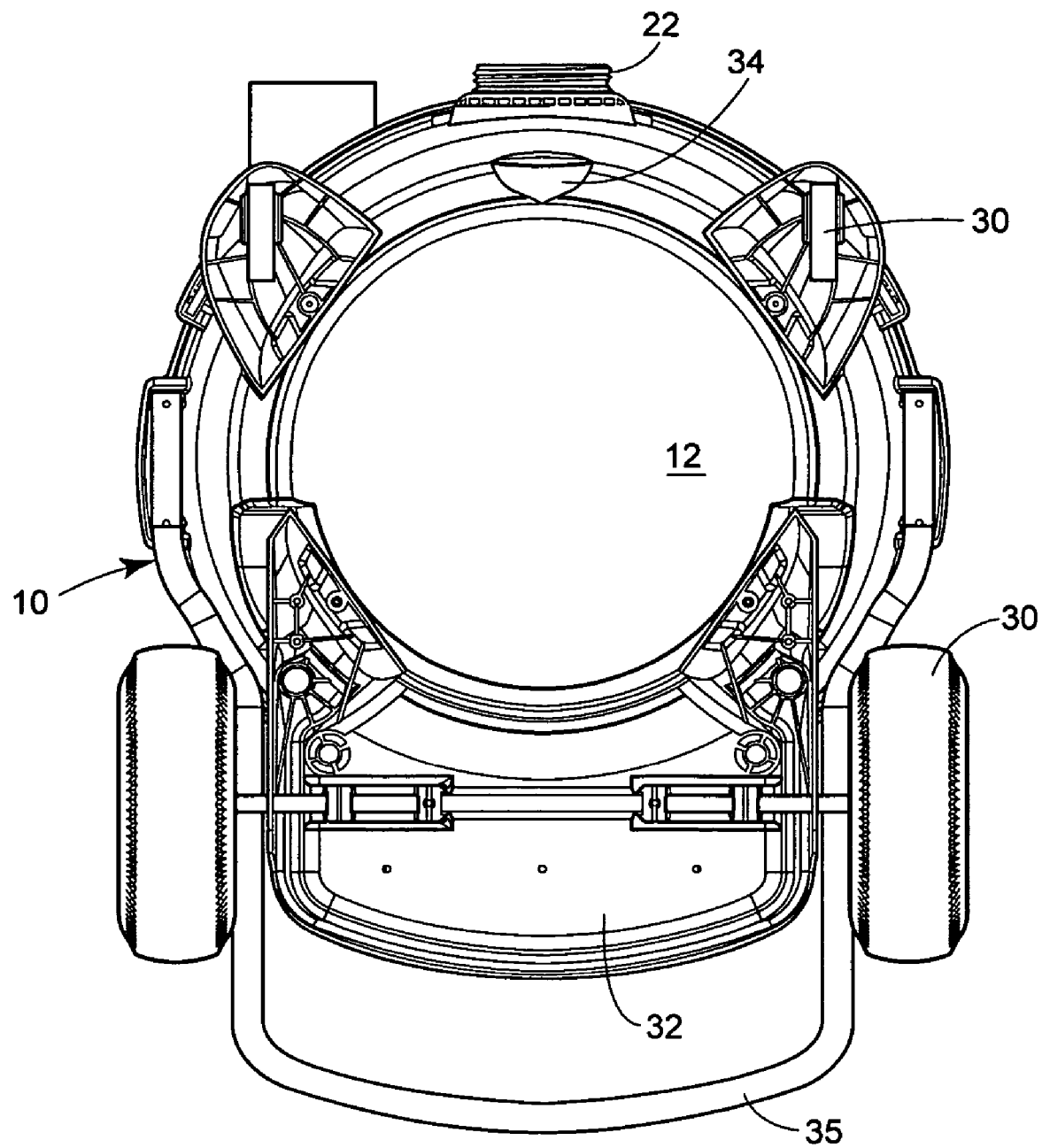
FIG. 7 is a bottom view of the mulcher.

The illustrated exhaust port 66 (FIG. 14) is positioned on the skirt wall 60 and is covered by an exhaust door 67 (FIGS. 6 and 10). The exhaust door is hinged at the top so that it swings outwardly when the pressure inside the vacuum exceeds the outside pressure, allowing air to exhaust from the unit. When the unit is turned off, the weight of the door causes it to close.

The lower rim 38 of the shredder assembly 14 is arranged so that it can be attached to the open top 24 of the base unit 12. Three latches 68 are provided on the illustrated base unit, and can be used to hold the shredder assembly to the base unit. Conventional latches are known.

The latches 68 are arranged so that they can also hold the head unit 16 to the base unit 12. Although other arrangements are possible, providing the expensive parts of the latches on the base unit, rather than on both the shredder assembly 14 and on the head unit, may be preferred as a way to minimize cost.

When the shredder assembly 14 is attached to the base unit 12, the opening of the lower rim 38 enables shredded leaves or yard waste cut by the shredding blade 40 to pass to the storage reservoir in the base unit. When the shredder assembly is removed from the base unit, the open top 24 of the base unit also accommodates the head unit 16.

As seen in FIGS. 15-21, mounting the head unit 16 on the base unit 12 creates a unit that can operate as a conventional utility vacuum cleaner. Comparable arrangements are described in U.S. Pat. No. 6,530,116. The disclosure of that patent is incorporated by reference into this disclosure.

In the illustrated device, a shredder power cord (not shown) extends from the shredder assembly 14 and can be used to provide AC power to the shredder motor. An optional power receptacle 69, best seen in FIG. 11, is electrically connected to the shredder power cord through a switch. The switch can be used to switch power coming in through the power cord to either the motor or, alternatively, to the receptacle. Providing a switch that directs power either to the motor or to the receptacle, but not to both simultaneously, helps to reduce the chance of overloading the circuit that the power cord is plugged into.

A detachable blower 72 can be used with either the shredder assembly 14 or the head unit 16. When used with the head unit, the blower provides the vacuum used for conventional vacuuming, as explained in the U.S. Pat. No. 6,530,116. When used with the shredder assembly, the blower can be used as an accessory tool. In that arrangement, a blower power cord for the blower can be plugged into the receptacle 68 on the shredder assembly, eliminating the need for the user to extend two separate cords to the primary power outlet. A caddy or supporting frame 74 on the shredder assembly (FIG. 9) accommodates the blower when it is not in use.

Another example of a shredder vacuum 10' is illustrated in FIGS. 32-40. This shredder vacuum 10' also has three primary parts: a base unit 12', a leaf shredder assembly 14', and a head unit 16'. Again, each part will be described in turn.

The illustrated base unit 12' has a tank wall 20' (FIG. 38), a closeable port 22', and an open top 24'. The storage reservoir within the tank wall is also used to store collected products, and can vary in size to meet consumer demands. The port can be used as an inlet during conventional vacuuming, or sealed with a cap 26' during mulching. The open top accommodates either the shredder assembly 14' (during mulching) or the head unit 16' (during conventional vacuuming).

The base unit 12' can also include optional features like wheels or casters 30', a storage compartment 32', or a drain 34'.

The shredder assembly 14' has a mulching inlet 36', a shredding blade 40' (FIG. 38), and a lower rim 38'. The mulching inlet can be attached to a hose and is used to collect leaves. The shredding blade cuts the leaves that are drawn in through the inlet. The shredding blade is powered by a motor, and is preferably optimized for shredding leaves, rather than for moving air. The lower rim is arranged so that it can be attached to the open top 24' of the base unit 12', and has an opening 138' (FIG. 36) that enables the shredded leaves to move through a passage 139' from the shredding blade to the storage reservoir in the base unit.

Unlike in the other embodiments, this shredder assembly 14' also has an upper opening 136'. The upper opening accommodates the head unit 16'.

Figure 37:
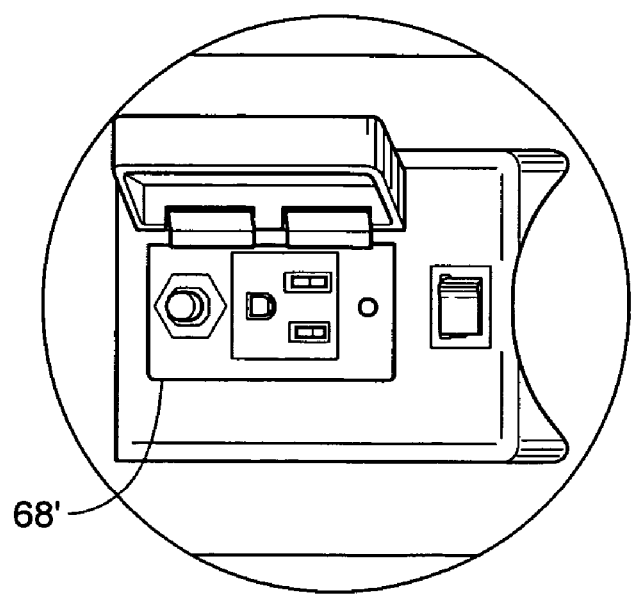
FIG. 37 is a cross-section view of the mulcher.

The shredder assembly 14' can also house an independent shredder motor for driving the shredding blade 40'. A shredder power cord running to the shredder motor can be used to provide AC power. When the shredder assembly is provided with its own power cord, it can also be provided with a power receptacle 68', as seen in FIG. 37. That receptacle is electrically connected to the shredder power cord. Including a receptacle on the shredder assembly can provide the same advantage described above.

The illustrated head unit 16' has a motor, an air impeller, a head inlet 140', and an exhaust port. The air impeller provides the motive force for drawing air, leaves, or other materials through the device. A conventional vacuum motor can be used to power the impeller. Relying on a separate impeller to provide the power for moving air through the device allows the shredding blade 40' to be specifically designed for shredding, rather than for moving air. Thus, a more efficient shredding blade can be used. Similarly, the air impeller can be specifically designed to move air and not for shredding, as is the case in some household leaf vacuums.

The head inlet 140' opens to the storage reservoir in the base unit 12', enabling the impeller to draw a vacuum in the reservoir through a passage 144' from the reservoir to the air impeller. The vacuum pulls leaves through the mulching inlet 36' during mulching operations and pulls dirt or debris through the port 22' in the base unit during vacuuming operations. The exhaust port allows air to escape from the unit.

The head unit 16' can also include one or more filters. The illustrated filter 150' is a common paper filter mounted on a filter cage. The illustrated additional filter 152' is a conical filter that preliminarily filters the air before it reaches the paper filter. A flange 154' (FIG. 36) on the additional filter can be sized so that it can rest on an upper rim on either the open top 24' of the base unit 12' or on an upper opening 156' on the shredder assembly 14'.

Figure 38:
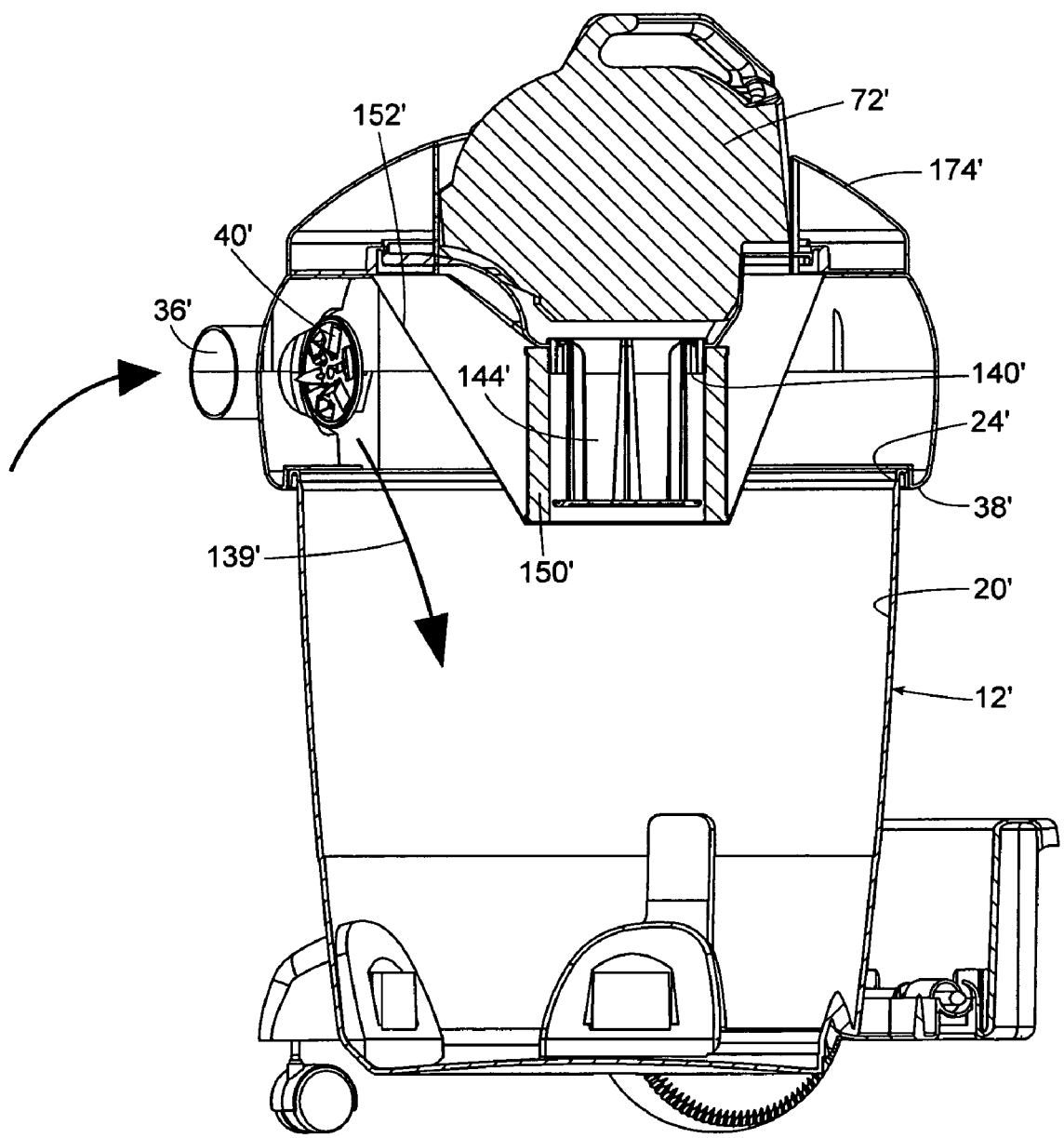
FIG. 38 is an enlarged view of an electrical receptacle on the shredder assembly.
Figure 39:
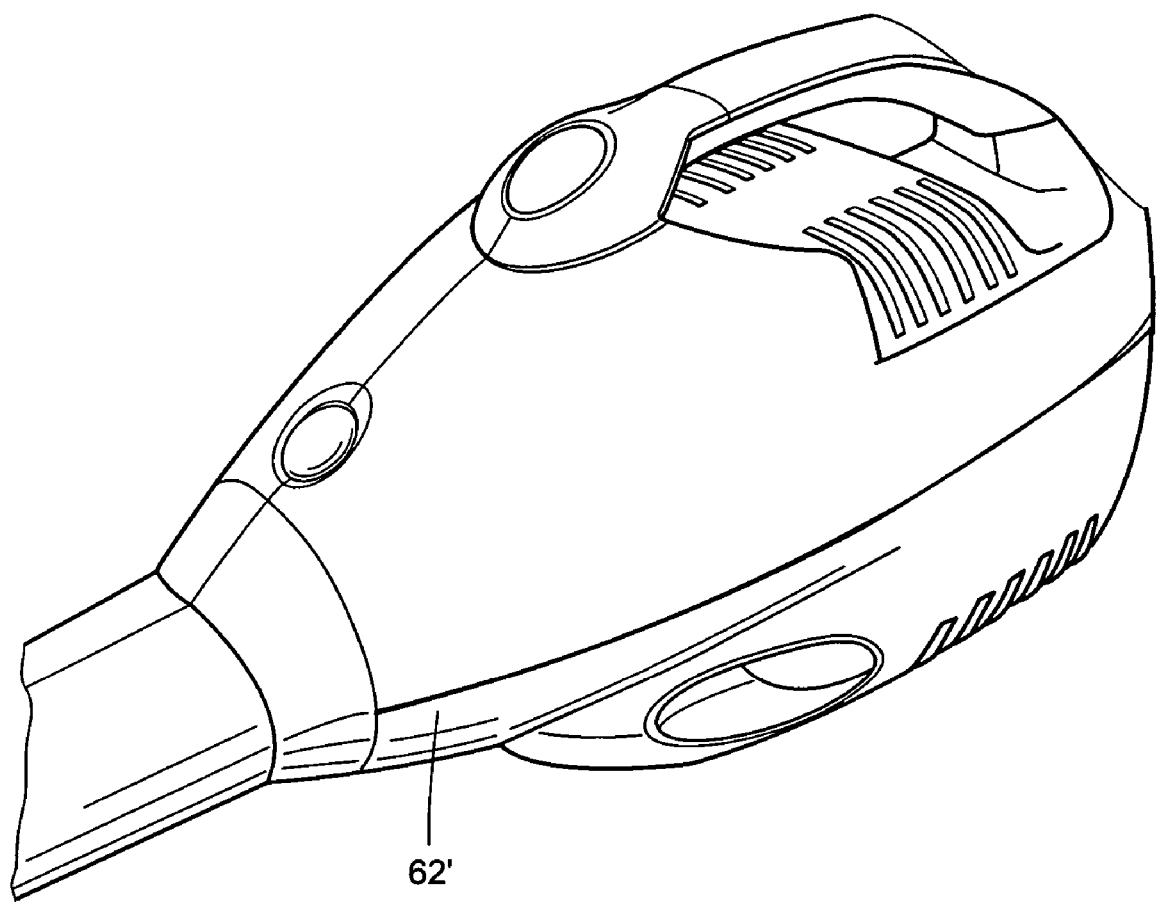
FIG. 39 is a perspective view of a detachable blower that can be incorporated into a head unit in the mulcher.
Figure 40:
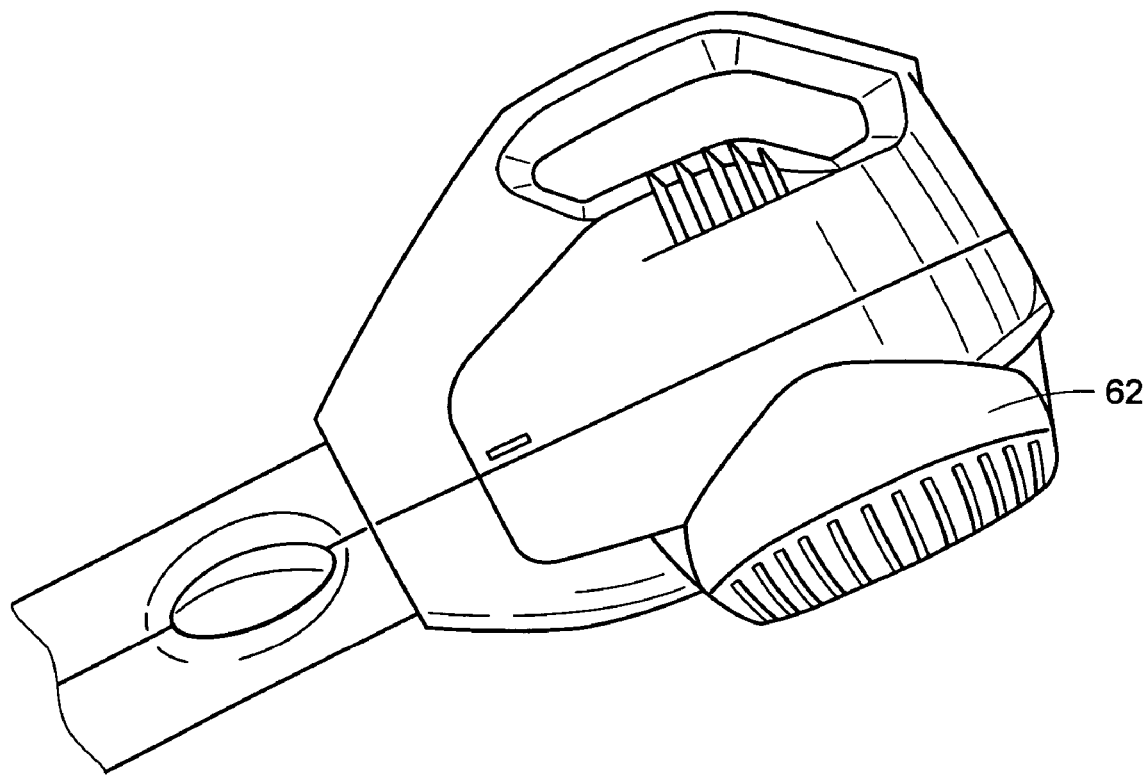
FIG. 40 is a side elevation view of an alternative arrangement of a detachable blower.

As seen in FIG. 38, the illustrated head unit 16' includes a supporting frame 174' and a detachable blower 72', which houses the motor and the air impeller. The illustrated blower can be separated from the supporting frame so that the blower can be used separately. Non-detachable motor/impeller assemblies can also be used with the head unit.

An impeller power cord can be used to provide AC power to the motor in the detachable blower 72'. When the shredder assembly 14' is provided with a separate shredder power cord and receptacle, the impeller power cord can be plugged into the receptacle on the shredder assembly to prevent the need for two separate cords to extend to user's primary power outlet.

The illustrated embodiments provide differing options for mulching yard waste while being able to use a conventional wet/dry vacuum cleaner tank as the storage reservoir for the mulched material. The embodiment of FIGS. 1-21 utilizes air flow paths generated in the tank to minimize the amount of mulched material that passes out of the tank. The embodiment of FIGS. 22-38 utilizes conventional vacuum cleaner filtering to minimize the escape of mulched material. In each embodiment, much of the mulched material that is entrained in air flowing from the shredding blade is removed from air before the air passes out of the storage reservoir.

This disclosure describes specific applications of the invention, and is intended to be illustrative only. It will be apparent to those of ordinary skill in the art that changes, additions, and deletions may be made to the disclosed embodiments without departing from the spirit and scope of the disclosure. The scope of the invention is set out in the following claims.

The invention claimed is:

1. A mulcher comprising:
an inlet for yard waste;
a storage reservoir in a base unit;
a shredding blade that is mounted in a unit that is separable from the base unit and is positioned in a conduit where substantially all material fed into the inlet engages the shredding blade immediately upon exiting the conduit;
an exhaust port that is in fluid communication with the shredding blade; and
a passage from the shredding blade to the exhaust port in which shredded material is removed from air exiting the shredding blade before the air passes through the exhaust port.

2. A mulcher as recited in claim 1, in which:
the shredding blade is mounted in front of and on the same shaft as an impeller;
the shredding blade has a forwardly-projecting portion; and
a back surface of the shredding blade is supported by a forward portion of the impeller.

3. A mulcher as recited in claim 1, in which:
the separable unit has a vacuum assembly that carries an air impeller; and
the shredding blade is in a shedder assembly that is user-separable from the vacuum assembly.

4. A mulcher as recited in claim 1, in which:
the shredding blade is in a shredder assembly;
the separable unit has a separate vacuum assembly with an air impeller; and
the base unit has a part to which both the shredder assembly and the vacuum assembly can be alternately attached.

5. A mulcher as recited in claim 1, in which the shredded material is removed from the air exiting the shredding blade by a filter interposed between the shredding blade and the exhaust port.

6. A mulcher that has:
an inlet for yard waste;
a storage reservoir in a base unit;
a shredding blade that is mounted in a unit that is separable from the base unit;
an exhaust port that is in fluid communication with the shredding blade;
an open-air passage from the shredding blade to the exhaust port in which shredded material is removed from air exiting the shredding blade before the air passes through the exhaust port; and
a wall that is interposed between the shredding blade and the exhaust port and forces air-borne shredded material exiting the shredding blade to change direction before reaching the exhaust port.

7. A mulcher as recited in claim 6, in which:
the wall is part of a tube;
the mulcher also has a channel adjacent the tube; and
air flows though the tube in one direction, and through the channel in an opposite direction.

8. A mulcher as recited in claim 6, in which:
the wall is part of a tube;
the mulcher also has a channel that is adjacent to and at least partially surrounds the tube; and
air flows though the tube in one direction, and through the channel in an opposite direction.

9. A mulcher that has:
an inlet for yard waste;
a storage reservoir in a base unit that has an open top;
a separable unit that has a lower rim that attaches to the open top of the base unit and has an opening that enables shredded material to pass from the shredding blade to the base unit when the separable unit is attached to the base unit;
a shredding blade that is mounted in the separable unit;
a pathway that leads from the inlet to the shredding blade;
an exhaust port that is in fluid communication with the shredding blade; and
a passage in which shredded material is removed from air exiting the shredding blade before the air passes through the exhaust port.

10. A mulcher as recited in claim 9, in which the mulcher also has:
   a shredder power cord; and
   an electrical receptacle.

11. A mulcher as recited in claim 9, in which the mulcher also has a detachable power module that houses both the shredding blade and a shredder motor.

12. A mulcher as recited in claim 9, in which the mulcher also has:
   a detachable power module; and
   a safety switch that disables the power module when the power module is detached.

13. A mulcher as recited in claim 9, in which the mulcher also has:
   an independent shredder motor that drives the shredding blade;
   a shredder power cord that runs from the shredder motor to an AC plug; and
   a power receptacle.

14. A mulcher as recited in claim 9, in which the mulcher also has:
   a power receptacle;
   a shredder motor; and
   a switch that alternately switches power to either the shredder motor or to the power receptacle, but not to both simultaneously.

15. A mulcher as recited in claim 1, in which the mulcher also has:
   an air moving unit that is user-separable from the separable unit, has an impeller, and is arranged for use as a hand-held blower.

16. A mulcher as recited in claim 15, in which:
   a blower has a blower power cord, houses an air impeller, and is user-separable from a supporting frame;
   the mulcher also has a separate shredder power cord; and
   the mulcher also has an electrical receptacle.

17. A mulcher as recited in claim 16, in which:
   the storage reservoir is in a base unit; and
   the base unit also has a separate, closable port.

18. A mulcher as recited in claim 1, in which the separable unit is separably attached to the top of the base unit.

* * * * *